(12) United States Patent
Umemoto et al.

(10) Patent No.: US 10,550,779 B2
(45) Date of Patent: Feb. 4, 2020

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Kazuhiro Umemoto, Ebina (JP); Toshihiro Mori, Gotenba (JP); Hiromasa Nishioka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 38 days.

(21) Appl. No.: 16/013,097

(22) Filed: Jun. 20, 2018

(65) Prior Publication Data

US 2018/0372012 A1 Dec. 27, 2018

(30) Foreign Application Priority Data

Jun. 23, 2017 (JP) .................. 2017-123628

(51) Int. Cl.
| | |
|---|---|
| *F01N 3/20* | (2006.01) |
| *F02D 41/02* | (2006.01) |
| *F01N 3/08* | (2006.01) |
| *F02D 41/00* | (2006.01) |
| *F02D 9/02* | (2006.01) |

(52) U.S. Cl.
CPC ....... *F02D 41/0275* (2013.01); *F01N 3/0814* (2013.01); *F01N 3/0842* (2013.01); *F01N 3/0871* (2013.01); *F02D 41/0055* (2013.01); *F01N 2900/08* (2013.01); *F01N 2900/1404* (2013.01); *F02D 9/02* (2013.01); *F02D 2009/0276* (2013.01); *F02D 2200/0802* (2013.01); *F02D 2200/0806* (2013.01); *F02D 2250/36* (2013.01)

(58) Field of Classification Search
CPC .... F01N 3/0814; F01N 3/0842; F01N 3/0871; F01N 2570/14; F01N 2900/1404; F01N 2900/1626; F02D 41/0275
See application file for complete search history.

(56) References Cited

FOREIGN PATENT DOCUMENTS

| | | |
|---|---|---|
| JP | 2003-269155 | 9/2003 |
| JP | 2004-76680 | 3/2004 |

(Continued)

*Primary Examiner* — Jonathan R Matthias
(74) *Attorney, Agent, or Firm* — Finnegan, Henderson, Farabow, Garrett & Dunner, LLP

(57) ABSTRACT

An exhaust gas control apparatus includes a fuel injection device, a NOx occlusion reduction catalyst, a fuel addition valve, an inflow gas adjustment device, and an electronic control unit. The electronic control unit executes a low flow rate reduction treatment for removing $NO_x$ occluded in the NOx occlusion reduction catalyst after fuel supply from the fuel injection device is stopped. The electronic control unit controls the inflow gas adjustment device such that a ratio of oxygen to the fuel added to the NOx occlusion reduction catalyst at a time when a temperature of the NOx occlusion reduction catalyst is below an activation temperature becomes higher than a ratio of oxygen to the fuel added to the NOx occlusion reduction catalyst at a time when the temperature of the NOx occlusion reduction catalyst is equal to or higher than the activation temperature during the low flow rate reduction treatment.

10 Claims, 11 Drawing Sheets

(56) References Cited

FOREIGN PATENT DOCUMENTS

| JP | 2006112347 A | * | 4/2006 |
|----|--------------|---|--------|
| JP | 2009-36175   |   | 2/2009 |
| JP | 2010-53841   |   | 3/2010 |
| JP | 2010-127146  |   | 6/2010 |

* cited by examiner

EXHAUST GAS CONTROL APPARATUS FOR INTERNAL COMBUSTION ENGINE

INCORPORATION BY REFERENCE

The disclosure of Japanese Patent Application No. 2017-123628 filed on Jun. 23, 2017 including the specification, drawings and abstract is incorporated herein by reference in its entirety.

BACKGROUND

1. Technical Field

The present disclosure relates to an exhaust gas control apparatus for an internal combustion engine.

2. Description of Related Art

An exhaust gas control apparatus for an internal combustion engine is known that is provided with a NOx occlusion reduction catalyst occluding nitrogen oxide ($NO_x$) contained in exhaust gas when the air-fuel ratio of the exhaust gas is lean (air-fuel ratio larger than a stoichiometric air-fuel ratio) and releasing the occluded $NO_x$ and removing the occluded $NO_x$ by reducing the occluded $NO_x$ when the air-fuel ratio of the exhaust gas is rich (air-fuel ratio smaller than the stoichiometric air-fuel ratio). An exhaust gas control apparatus for an internal combustion engine is known that allows exhaust gas with a rich air-fuel ratio to stay in a $NO_x$ occlusion reduction catalyst by performing a low flow rate reduction treatment for adding a fuel toward the $NO_x$ occlusion reduction catalyst when an engine is stopped so that the $NO_x$ occluded in the $NO_x$ occlusion reduction catalyst as described above is removed (refer to Japanese Unexamined Patent Application Publication No. 2010-127146 (JP 2010-127146 A)). The exhaust gas control apparatus for an internal combustion engine that is disclosed in JP 2010-127146 A allows the exhaust gas with a rich air-fuel ratio to stay in the $NO_x$ occlusion reduction catalyst, and thus the $NO_x$ is reduced with sufficient time for the removal. As a result, the efficiency of the $NO_x$ removal is enhanced.

SUMMARY

The related art assumes that the temperature of the NOx occlusion reduction catalyst is equal to or higher than a catalyst activation temperature (such as 300° C.) during the $NO_x$ removal. Accordingly, the low flow rate reduction treatment as described above needs to be performed when the temperature of the NOx occlusion reduction catalyst at a time when the engine is stopped is equal to or higher than the activation temperature or performed after the temperature of the NOx occlusion reduction catalyst is raised to at least the activation temperature immediately before the engine is stopped. However, once the low flow rate reduction treatment is performed when the temperature of the NOx occlusion reduction catalyst at a time when the engine is stopped is equal to or higher than the activation temperature, the frequency of execution of the low flow rate reduction treatment declines and the $NO_x$ occluded in the NOx occlusion reduction catalyst cannot be released and removed in an appropriate manner. Deterioration of fuel economy arises once the temperature of the NOx occlusion reduction catalyst is raised immediately before the engine is stopped so that the low flow rate reduction treatment is performed.

The present disclosure provides an exhaust gas control apparatus for an internal combustion engine that appropriately releases and removes the $NO_x$ occluded in a NOx occlusion reduction catalyst and suppresses deterioration of fuel economy at the same time.

A first aspect of the present disclosure relates to an exhaust gas control apparatus for an internal combustion engine. The exhaust gas control apparatus includes a fuel injection device configured to supply a fuel to a combustion chamber of an internal combustion engine and a NOx occlusion reduction catalyst disposed on an exhaust passage. In addition, the exhaust gas control apparatus includes a fuel addition valve disposed on the exhaust passage and on an upstream side of the NOx occlusion reduction catalyst in a direction in which exhaust flows and configured to add a fuel to the NOx occlusion reduction catalyst and an inflow gas adjustment device configured to adjust the amount of fresh gas supplied to the NOx occlusion reduction catalyst. Furthermore, the exhaust gas control apparatus includes an electronic control unit configured to control the fuel injection device, the fuel addition valve, and the inflow gas adjustment device, execute a low flow rate reduction treatment when the fuel supply from the fuel injection device is stopped and a flow rate of exhaust gas supplied to the NOx occlusion reduction catalyst is smaller than during an operation of the internal combustion engine, the low flow rate reduction treatment being processing for removing $NO_x$ occluded in the NOx occlusion reduction catalyst by adding the fuel from the fuel addition valve to the NOx occlusion reduction catalyst, and control the inflow gas adjustment device such that a ratio of oxygen to the fuel added to the NOx occlusion reduction catalyst at a time when a temperature of the NOx occlusion reduction catalyst is below a predetermined temperature determined in advance becomes higher than a ratio of oxygen to the fuel added to the NOx occlusion reduction catalyst at a time when the temperature of the NOx occlusion reduction catalyst is equal to or higher than the predetermined temperature during the low flow rate reduction treatment.

In the exhaust gas control apparatus according to the first aspect of the present disclosure, the electronic control unit may be configured to control the fuel addition valve such that the fuel is added by a total fuel addition amount calculated based on a $NO_x$ occlusion amount of the NOx occlusion reduction catalyst and control the inflow gas adjustment device such that oxygen is supplied to the NOx occlusion reduction catalyst by a total oxygen amount calculated based on the amount of the fuel added from the fuel addition valve in a case where the low flow rate reduction treatment is performed in a state where the temperature of the NOx occlusion reduction catalyst is below the predetermined temperature.

In the exhaust gas control apparatus according to the first aspect of the present disclosure, the inflow gas adjustment device may be an intake air flow rate-adjustable throttle valve and the electronic control unit may control an opening degree of the throttle valve such that a total amount of air supplied to the NOx occlusion reduction catalyst after the fuel supply is stopped becomes larger in the case where the low flow rate reduction treatment is performed in the state where the temperature of the NOx occlusion reduction catalyst is below the predetermined temperature than in a case where the low flow rate reduction treatment is not performed.

In the exhaust gas control apparatus according to the first aspect of the present disclosure, the inflow gas adjustment device may be an intake air flow rate-adjustable throttle valve, the electronic control unit may be configured to control the opening degree of the throttle valve such that the opening degree of the throttle valve is reduced in stages after the fuel supply from the fuel injection device is stopped when the temperature of the NOx occlusion reduction catalyst is below the predetermined temperature in a case where the low flow rate reduction treatment is performed, and the electronic control unit may be configured to control the opening degree of the throttle valve such that the opening degree of the throttle valve reaches zero at once after the fuel supply from the fuel injection device is stopped when the temperature of the NOx occlusion reduction catalyst is equal to or higher than the predetermined temperature in the case where the low flow rate reduction treatment is performed.

In the exhaust gas control apparatus according to the first aspect of the present disclosure, the electronic control unit may be configured to perform the low flow rate reduction treatment in a case where a $NO_x$ occlusion amount of the NOx occlusion reduction catalyst is smaller than an upper limit value determined in advance when the fuel supply from the fuel injection device is stopped.

In the exhaust gas control apparatus according to the first aspect of the present disclosure, the upper limit value set when the fuel injection is stopped in conjunction with an ignition switch being switched to OFF may differ from the upper limit value set when the fuel injection is stopped in conjunction with deceleration.

The exhaust gas control apparatus according to the first aspect of the present disclosure may further include an external EGR device including an EGR passage allowing the exhaust passage and an intake passage of an internal combustion engine to communicate with each other and an EGR valve disposed on the EGR passage and a throttle valve configured to adjust an intake air flow rate. The inflow gas adjustment device may be the throttle valve and the external EGR device, and the electronic control unit may be configured to control an opening degree of the EGR valve such that the opening degree of the EGR valve exceeds zero while controlling an opening degree of the throttle valve such that the opening degree of the throttle valve is reduced in stages after the fuel supply from the fuel injection device is stopped when the temperature of the NOx occlusion reduction catalyst is below the predetermined temperature during the low flow rate reduction treatment.

In the exhaust gas control apparatus according to the first aspect of the present disclosure, the predetermined temperature may be a catalyst activation temperature.

In the exhaust gas control apparatus according to the first aspect of the present disclosure, the electronic control unit may be configured to control the inflow gas adjustment device such that the ratio of the oxygen to the fuel added to the NOx occlusion reduction catalyst becomes a ratio at which the amount of the fuel added from the fuel addition valve and converted to CO in the NOx occlusion reduction catalyst is equal to or greater than a predetermined amount in the case where the low flow rate reduction treatment is performed in the state where the temperature of the NOx occlusion reduction catalyst is below the predetermined temperature.

According to the aspect of the present disclosure, the $NO_x$ occluded in the NOx occlusion reduction catalyst can be appropriately released and removed and deterioration of fuel economy can be suppressed at the same time irrespective of the temperature of the NOx occlusion reduction catalyst.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Example

Figure 1:
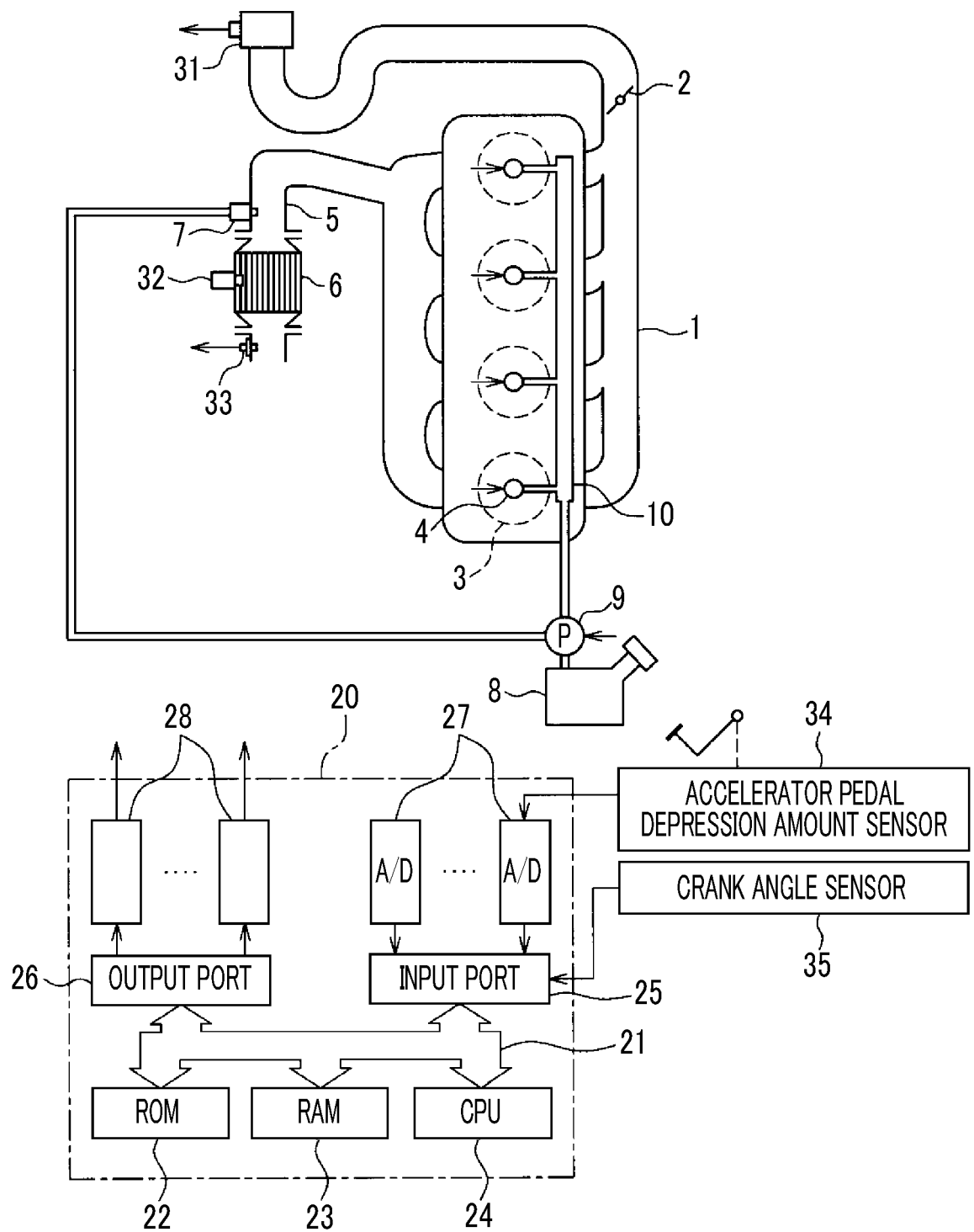
FIG. 1 is a schematic configuration diagram of an exhaust gas control apparatus for an internal combustion engine according to a first example.

FIG. 1 is a schematic configuration diagram of an exhaust gas control apparatus for an internal combustion engine according to a first example of the present disclosure. In the first example, the internal combustion engine is a diesel engine and the internal combustion engine is provided with an intake passage 1, a throttle valve 2, a combustion chamber 3, an injector 4, an exhaust passage 5, a NOx occlusion reduction catalyst 6, and a fuel addition valve 7. The intake passage 1 and the exhaust passage 5 communicate with the combustion chamber 3 so that air flows into the combustion chamber 3 through the intake passage 1 and the air flows out from the combustion chamber 3 through the exhaust passage 5.

The throttle valve 2 is disposed in the intake passage 1. The throttle valve 2 is a valve for adjusting the amount of the air supplied into the combustion chamber 3. The air amount adjustment is performed by the opening degree of the throttle valve 2 being adjusted. In the first example, the opening degree of the throttle valve 2 is electronically controlled by a throttle valve drive actuator.

The combustion chamber 3 is a space formed for combustion of an air-fuel mixture in which intake gas and a fuel are mixed with each other. In the first example, the combustion chamber 3 is defined by a cylinder block, a cylinder head, and a piston of an engine body.

The injector 4 is a nozzle for supplying the fuel into the combustion chamber 3. In the first example, the injector 4 is disposed to face the combustion chamber 3 and directly injects the fuel into the combustion chamber 3. The injector 4 may also be disposed at the cylinder head for fuel injection into an intake port.

The NOx occlusion reduction catalyst 6 is disposed in the exhaust passage 5. Accordingly, exhaust gas discharged from the combustion chamber 3 flows into the NOx occlusion reduction catalyst 6. The NOx occlusion reduction catalyst 6 occludes the $NO_x$ contained in the exhaust gas when the exhaust gas flowing into the NOx occlusion reduction catalyst 6 is in an oxygen excess state, that is, when the air-fuel ratio of the exhaust gas is lean. The NOx occlusion reduction catalyst 6 releases the $NO_x$ occluded in the NOx occlusion reduction catalyst 6 into the exhaust gas when the exhaust gas flowing into the NOx occlusion reduction catalyst 6 is in a fuel excess state, that is, when the air-fuel ratio of the exhaust gas is rich. The $NO_x$ released into the exhaust gas is reduced by a reducing agent such as the fuel in the exhaust gas and removed.

The fuel addition valve 7 is a nozzle for adding a fuel into the exhaust gas by injecting the fuel into the exhaust passage 5. The fuel addition valve 7 is disposed on the exhaust passage 5 and on the upstream side of the NOx occlusion reduction catalyst 6 in the direction in which the exhaust flows. Once the fuel addition valve 7 adds the fuel, the exhaust gas that contains the added fuel is supplied to the NOx occlusion reduction catalyst 6. In other words, the fuel addition valve 7 supplies the NOx occlusion reduction catalyst 6 with the fuel as the reducing agent. The amount of the fuel addition by the fuel addition valve 7 is controlled by an electronic control unit 20 (described later).

The internal combustion engine according to the first example is provided with a fuel tank 8, a supply pump 9, and a common rail 10. The fuel that is stored in the fuel tank 8 is pressurized by the supply pump 9, supplied to the injector 4 of each cylinder via the common rail 10, and injected from the injector 4 to the combustion chamber 3.

A digital computer constitutes the electronic control unit 20. The electronic control unit 20 is provided with a read-only memory (ROM) 22, a random access memory (RAM) 23, a central processing unit (CPU) 24, an input port 25, and an output port 26 interconnected by a bidirectional bus 21.

The internal combustion engine according to the first example is provided with an air flow meter 31 disposed on the intake passage 1 and upstream of the throttle valve 2 in the direction in which intake air flows. The air flow meter 31 detects the flow rate of the air that circulates through the intake passage 1. Accordingly, the air flow meter 31 is capable of detecting an intake air flow rate Ga supplied into the combustion chamber 3. The internal combustion engine according to the first example is provided with a temperature sensor 32 disposed at the NOx occlusion reduction catalyst 6 and an air-fuel ratio sensor 33 disposed downstream of the NOx occlusion reduction catalyst 6 in the direction in which the exhaust flows. The temperature sensor 32 detects the temperature of the NOx occlusion reduction catalyst 6, and the air-fuel ratio sensor 33 detects the air-fuel ratio of the exhaust gas flowing out from the NOx occlusion reduction catalyst 6. The air flow meter 31, the temperature sensor 32, and the air-fuel ratio sensor 33 are connected to the input port 25 via a corresponding AD converter 27, and thus signals from the sensors described above are input to the input port 25.

An accelerator pedal depression amount sensor 34 detecting an accelerator pedal depression amount as the load of the internal combustion engine is connected to the input port 25, and thus the output of the accelerator pedal depression amount sensor 34 is input to the input port 25. A crank angle sensor 35 for detecting the rotation speed of a crankshaft is connected to the input port 25, and thus the output of the crank angle sensor 35 is input to the input port 25 as well. As described above, output signals of various sensors needed for internal combustion engine control are input to the input port 25.

The output port 26 is connected to each actuator controlling the operation of the internal combustion engine via a corresponding drive circuit 28. In the example that is illustrated in FIG. 1, the output port 26 is connected to the injector 4, the fuel addition valve 7, the supply pump 9, and the throttle valve drive actuator. The electronic control unit 20 outputs a control signal controlling the actuators described above from the output port 26. Accordingly, the fuel injection from the injector 4, the fuel addition from the fuel addition valve 7, and the opening degree of the throttle valve 2 (hereinafter, referred to as a "throttle opening degree") are controlled by the electronic control unit 20.

Figure 2:
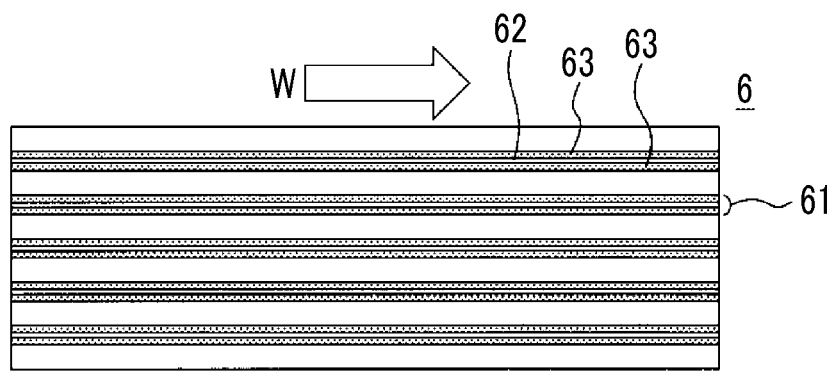
FIG. 2 is a side sectional view in which a NOx occlusion reduction catalyst is cut along a direction in which exhaust gas flows.

FIG. 2 is a side sectional view in which the NOx occlusion reduction catalyst 6 is cut along the direction in which the exhaust gas flows. The NOx occlusion reduction catalyst 6 has a uniform cross section over the entire length and forms a cylindrical shape extending in the direction in which the exhaust gas flows (direction of the arrow W in FIG. 2). A plurality of exhaust gas flow passages surrounded by a partition wall 61 is formed in the inner portion of the NOx occlusion reduction catalyst 6. The exhaust gas flow passage has a square cross section and is formed to linearly extend while maintaining a constant width. The partition wall 61 that forms the exhaust gas flow passage is provided with a substrate 62 and a catalyst layer 63 formed on the surface of the substrate 62. The substrate 62 is made of ceramic and formed of, for example, cordierite, mullite, and α-alumina. Although not particularly limited, it is preferable in the case described above that the substrate 62 is formed of cordierite.

The catalyst layer 63 includes a catalytic precious metal for $NO_x$ removal, a $NO_x$ occlusion material for $NO_x$ occlusion, and a carrier carrying the catalytic precious metal and the $NO_x$ occlusion material. In the first example, the carrier is aluminum oxide ($Al_2O_3$).

The catalytic precious metal has an action to promote oxidation of HC and CO and an action to promote $NO_x$ reduction, that is, catalytic actions. The catalytic precious metal is formed of at least one precious metal among platinum (Pt), palladium (Pd), and rhodium (Rh). In the first example, the catalytic precious metal contains each of Pt, Pd, and Rh.

The $NO_x$ occlusion material occludes $NO_x$ when the air-fuel ratio of the exhaust gas is lean and releases $NO_x$ when the air-fuel ratio of the exhaust gas is rich. The $NO_x$ occlusion material is any one or both of alkali metals, alkaline earth metals, and rare earth metals. For example, the alkali metals are potassium (K), rubidium (Rb), and cesium (Cs), the alkaline earth metals are calcium (Ca), strontium (Sr), and barium (Ba), and the rare earth metals are lanthanum (La), cerium (Ce), and praseodymium (Pr). In the first example, the $NO_x$ occlusion material is an oxide of Ce and Ba.

The "occlusion" of $NO_x$ includes the two actions of "adsorption" and "absorption". The "adsorption" means holding of $NO_x$ on the surface of the $NO_x$ occlusion material by an intermolecular force weaker than ionic bond such as a Van der Waals force. The "absorption" means that $NO_2$ becomes a nitrate ion ($NO_3^-$) by being further oxidized and is held in the form of nitrate by the $NO_x$ occlusion material.

A mechanism by which the NOx occlusion reduction catalyst 6 occludes and reduces $NO_x$ will be briefly described. The air-fuel ratio of the exhaust gas discharged from the diesel engine is lean in normal cases where the internal combustion engine outputs power. When the air-fuel ratio of the exhaust gas is lean as described above, the $NO_x$ in the exhaust gas is occluded in the NOx occlusion reduction catalyst 6. Once the air-fuel ratio of the exhaust gas becomes rich by the exhaust gas being mixed with the reducing agent such as the fuel, the $NO_x$ occluded in the NOx occlusion reduction catalyst 6 reacts with the reducing agent (hydrocarbon HC and carbon monoxide CO) via the catalytic precious metal, is reduced to $N_2$, and is removed.

The following two methods are for reducing and removing the $NO_x$ occluded in the NOx occlusion reduction catalyst 6. According to one, fuel addition from the injector 4 or the fuel addition valve 7 is performed during the operation of the internal combustion engine so that the air-fuel ratio of the exhaust gas flowing into the NOx occlusion reduction catalyst 6 becomes rich and the $NO_x$ occluded in the NOx occlusion reduction catalyst 6 is reduced and removed by the fuel in the exhaust gas flowing into the NOx occlusion reduction catalyst 6. Hereinafter, the method described above will be referred to as a "normal reduction treatment". During the operation of the internal combustion engine, the gas that passes through the NOx occlusion reduction catalyst 6 has a large flow rate per unit time (space velocity). Accordingly, the reducing agent entering the NOx occlusion reduction catalyst 6 passes through the NOx occlusion reduction catalyst 6 within a relatively short period without staying. In the case described above, the time for the reaction between the occluded $NO_x$ and the reducing agent is short, and thus the $NO_x$ is not removed unless the reactivity of the catalytic precious metal is increased. Accordingly, in the first method, the NOx occlusion reduction catalyst 6 is heated so that the temperature of the NOx occlusion reduction catalyst 6 becomes equal to or higher than the activation temperature of the catalytic precious metal carried on the NOx occlusion reduction catalyst 6 (hereinafter, referred to as a "catalyst activation temperature"), and then the air-fuel ratio of the exhaust gas becomes rich and the occluded $NO_x$ is reduced as a result.

According to the second method, the opening degree of the throttle valve 2 is lowered and the reducing agent is added from the fuel addition valve 7 to the NOx occlusion reduction catalyst 6 in the fuel supply from the injector 4 being stopped. After the fuel supply from the injector 4 is stopped, the flow rate of the exhaust gas supplied to the NOx occlusion reduction catalyst 6 is smaller than during the operation of the internal combustion engine. The occluded $NO_x$ can be reduced and removed by the fuel staying in the NOx occlusion reduction catalyst 6 by the fuel being added from the fuel addition valve 7 when the flow rate of the exhaust gas is small as described above so that the air-fuel ratio of the exhaust gas in the NOx occlusion reduction catalyst 6 becomes rich. Hereinafter, the method described above will be referred to as a "low flow rate reduction treatment".

Figure 3:
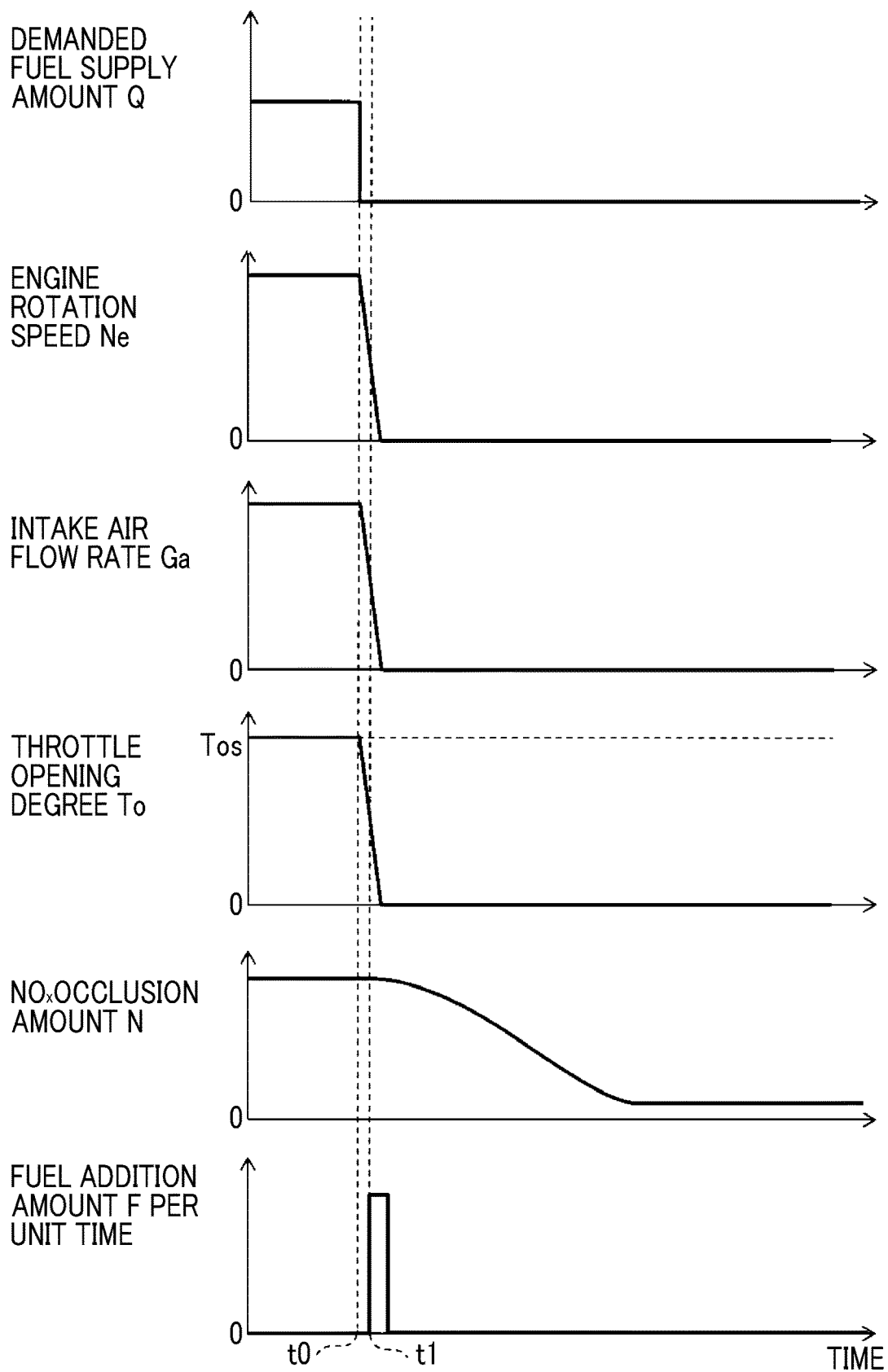
FIG. 3 is a timing chart of a low flow rate reduction treatment in a case where the temperature of the $NO_x$ occlusion reduction catalyst is equal to or higher than a catalyst activation temperature.

FIG. 3 is a timing chart at a time when the low flow rate reduction treatment is executed. In FIG. 3, time changes in a demanded fuel supply amount Q, an engine rotation speed Ne, the intake air flow rate Ga, a throttle opening degree To, a $NO_x$ occlusion amount N, and a fuel addition amount F per unit time are shown from above.

FIG. 3 shows the case of a request for stopping the fuel supply from the injector 4 being made by an ignition switch being turned OFF at time t0. Upon the request for stopping the fuel supply being made at time t0, the demanded fuel supply amount Q is set to zero, the fuel supply from the injector 4 is stopped, and the throttle opening degree To is sharply reduced to zero. The intake air flow rate Ga measured by the air flow meter 31 decreases with the decline in the throttle opening degree To.

At time t1, the fuel is added from the fuel addition valve 7 to the NOx occlusion reduction catalyst 6 during the decline in the throttle opening degree To. In the case described above, the space velocity of the exhaust gas supplied to the NOx occlusion reduction catalyst 6 decreases, and thus the exhaust gas stays in the NOx occlusion reduction catalyst 6. Accordingly, the fuel added to the exhaust gas from the fuel addition valve 7 also stays in the NOx occlusion reduction catalyst 6. While the fuel stays in the NOx occlusion reduction catalyst 6, the $NO_x$ occluded in the NOx occlusion reduction catalyst 6 is reduced by the fuel.

In a case where the temperature of the NOx occlusion reduction catalyst 6 is equal to or higher than the catalyst activation temperature and is relatively high and oxygen ($O_2$) is contained in the exhaust gas, the reducing agent reacts with the oxygen ahead of the $NO_x$. Accordingly, in general, the $NO_x$ is unlikely to be reduced by the reducing agent when the exhaust gas contains a large amount of oxygen. It is known that it is preferable for this reason that the amount of the oxygen supplied to the NOx occlusion reduction catalyst 6 is kept to a minimum when the $NO_x$ occluded in the NOx occlusion reduction catalyst 6 is reduced. However, the $NO_x$ can still be reduced even in a case where the NOx occlusion reduction catalyst 6 has a relatively low temperature (such as 200° C. or less) and the $NO_x$ removal rate during the low flow rate reduction treatment can be increased by the exhaust gas containing oxygen in the case described above.

Figure 4A:
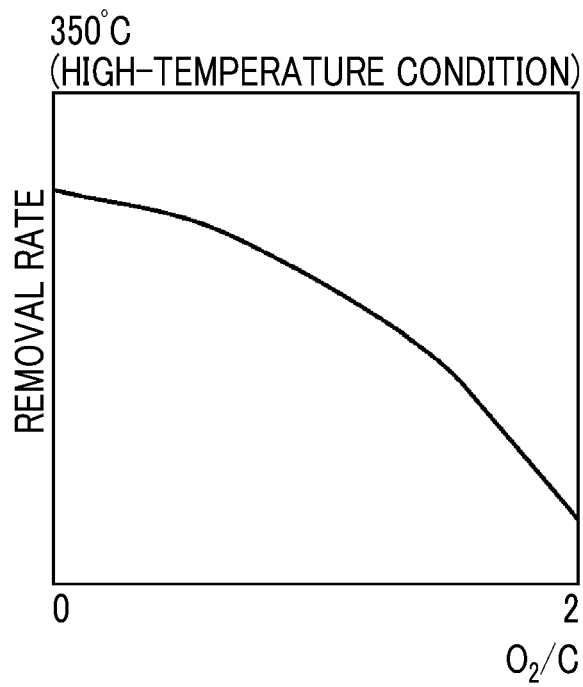
FIG. 4A is a graph illustrating the qualitative relationship between $O_2/C$ and a $NO_x$ removal rate at a time when the temperature of the NOx occlusion reduction catalyst is equal to or higher than the catalyst activation temperature.

FIG. 4A is a graph showing the qualitative relationship between $O_2/C$ and the $NO_x$ removal rate at a time when the temperature of the NOx occlusion reduction catalyst 6 is equal to or higher than the catalyst activation temperature (such as 300° C.). The $O_2/C$ means the molar ratio of the oxygen molecule ($O_2$) in the gas supplied to the NOx occlusion reduction catalyst 6 to the carbon atom (C) added from the fuel addition valve 7. In other words, the $O_2/C$ means the ratio of oxygen to the fuel added from the fuel addition valve 7.

The $O_2/C$ will be described in detail below. Assuming that the total mol number of the carbon atoms in the fuel added from the fuel addition valve 7 is the total mol number of C, the $O_2/C$ is (total mol number of $O_2$)/(total mol number of C). The total mol number of $O_2$ is the mol number of the $O_2$ supplied to the NOx occlusion reduction catalyst 6 after the fuel supply from the injector 4 is stopped. The total mol number of the $O_2$ increases as the total amount of the fresh gas that passes through the throttle valve 2 while the low flow rate reduction treatment is performed increases. In other words, the $O_2$ contained in the fresh gas that passes through the throttle valve 2 while the low flow rate reduction treatment is performed is not consumed by the fuel combustion in the combustion chamber 3, and thus is introduced into the exhaust passage 5 through the combustion chamber 3. The oxygen concentration of the exhaust gas increases and the total mol number of the $O_2$ increases by the fresh gas passing through the throttle valve 2 being mixed with the exhaust gas remaining upstream of the NOx occlusion reduction catalyst 6 on the exhaust passage 5. Accordingly, the total mol number of the $O_2$ supplied to the NOx occlusion reduction catalyst 6 increases as the flow rate of the air passing through the throttle valve 2 while the low flow rate reduction treatment is performed increases and increases as the time integral value of the intake air flow rate Ga measured by the air flow meter 31 increases. To put it another way, it is said that the total mol number of the $O_2$ supplied to the NOx occlusion reduction catalyst 6 is proportional to the total amount of the air supplied to the NOx occlusion reduction catalyst 6 after the fuel supply is stopped. In the first example, the $O_2/C$ is an amount that changes depending on the intake air flow rate Ga and the fuel addition amount from the fuel addition valve 7 as described above and the $O_2/C$ can be controlled by at least one of the intake air flow rate Ga and the fuel addition amount being controlled during the low flow rate reduction treatment.

As is apparent from FIG. 4A, in a case where the temperature of the NOx occlusion reduction catalyst 6 is equal to or higher than the catalyst activation temperature, the $NO_x$ removal rate falls as the $O_2/C$ increases. The reason why the phenomenon described above occurs is inferred as follows. In other words, in a case where the temperature of the NOx occlusion reduction catalyst 6 is equal to or higher than the catalyst activation temperature with $O_2$ present in the exhaust gas, the reducing agent (HC and CO) supplied to the NOx occlusion reduction catalyst 6 reacts with the $O_2$ in the exhaust gas before reacting with the occluded $NO_x$. Accordingly, the amount of the reducing agent contributing to the $NO_x$ substantially decreases. Therefore, in a case where the temperature of the NOx occlusion reduction catalyst 6 is equal to or higher than the catalyst activation temperature, the $NO_x$ removal rate can be increased by the amount of the oxygen supplied to the NOx occlusion reduction catalyst 6 being kept to a minimum while the low flow rate reduction treatment is performed.

Figure 4B:
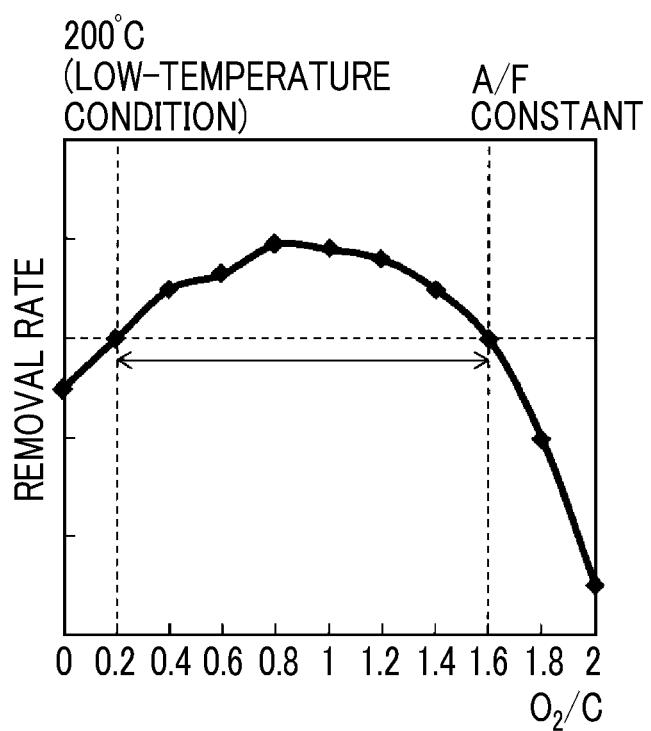
FIG. 4B is a graph illustrating the qualitative relationship between the $O_2/C$ and the $NO_x$ removal rate at a time when the temperature of the NOx occlusion reduction catalyst is below the catalyst activation temperature.

FIG. 4B is a graph showing the relationship between the $O_2/C$ and the $NO_x$ removal rate at a time when the $NO_x$ occlusion reduction catalyst 6 has a temperature (such as 200° C.) lower than the catalyst activation temperature. As is apparent from FIG. 4B, in a case where the temperature of the NOx occlusion reduction catalyst 6 is lower than the catalyst activation temperature, the $NO_x$ removal rate gradually rises and the $O_2/C$ increases from zero, the $NO_x$ removal rate reaches its peak when the $O_2/C$ is close to 1, and the $NO_x$ removal rate gradually falls as the $O_2/C$ increases from close to 1. The reason for the above is inferred as follows.

When the $O_2/C$ is close to zero, the amount of the oxygen that is supplied to the NOx occlusion reduction catalyst 6 is small. Accordingly, the HC added from the fuel addition valve 7 is hardly oxidized and reacts with the $NO_x$. In other words, the $NO_x$ reduction reaction is performed mainly by the HC. Still, the $NO_x$ removal rate is not so high since the temperature of the NOx occlusion reduction catalyst 6 is low.

When the $O_2/C$ is close to 1, the HC added from the fuel addition valve 7 is oxidized in part. In a case where the temperature of the NOx occlusion reduction catalyst 6 is lower than the catalyst activation temperature, the reactivity of the HC is worse than in a case where the temperature of the NOx occlusion reduction catalyst 6 is equal to or higher than the catalyst activation temperature, and thus some of the HC becomes CO without being oxidized to become $CO_2$. Accordingly, the $NO_x$ reduction reaction is performed mainly by the HC and the CO. The CO is higher in $NO_x$ reactivity than the HC, and thus the $NO_x$ removal rate is improved compared to when the $NO_x$ is reduced mainly by the HC (when the $O_2/C$ is close to zero).

When the $O_2/C$ is close to 2, the exhaust gas contains more oxygen than when the $O_2/C$ is close to 1, and thus a large amount of HC is oxidized and becomes $CO_2$. It is conceivable that the amount of the reducing agent decreases and the $NO_x$ removal rate is lower than when the $O_2/C$ is 1 as a result.

As described above, in a case where the temperature of the NOx occlusion reduction catalyst 6 is lower than the catalyst activation temperature of the catalytic precious metal contained in the NOx occlusion reduction catalyst 6 when the low flow rate reduction treatment is performed, the $NO_x$ removal rate is higher when the $O_2/C$ is close to 1 than when the $O_2/C$ is close to zero, and thus it is preferable that the oxygen is supplied to some extent to, for example, the NOx occlusion reduction catalyst 6.

As described above and as is apparent from FIGS. 4A and 4B, when the low flow rate reduction treatment is performed with the temperature of the NOx occlusion reduction catalyst 6 equal to or higher than the catalyst activation temperature, the reducing agent (HC and CO) is unlikely to react with the $O_2$ in the exhaust gas by the $O_2/C$ being controlled such that the $O_2/C$ is kept at a minimum, and thus the $NO_x$ removal rate is improved. When the temperature of the NOx occlusion reduction catalyst 6 is lower than the catalyst activation temperature, CO with a high $NO_x$ reactivity is generated and the $NO_x$ removal rate is improved as a result by the $O_2/C$ being increased compared to when the temperature of the NOx occlusion reduction catalyst 6 is equal to or higher than the catalyst activation temperature (the $O_2/C$ is close to zero). It is appreciated that, especially when the temperature of the NOx occlusion reduction catalyst 6 is lower than the catalyst activation temperature, the $NO_x$ removal rate is increased by the $O_2/C$ being controlled such that the $O_2/C$ is close to 1.

The catalyst activation temperature is a temperature at which the catalytic action of the catalytic precious metal significantly changes, and the $NO_x$ is removed at or above the catalyst activation temperature during the normal reduction treatment performed while the engine operation continues. The catalyst activation temperature changes depending on the composition of the catalyst layer 63 included in the NOx occlusion reduction catalyst 6. In the case of the first example, the catalyst activation temperature is a temperature from 200° C. to 350° C. and is, for example, 300° C.

In the first example, the control of the low flow rate reduction treatment is switched depending on whether or not the temperature of the NOx occlusion reduction catalyst 6 is equal to or higher than the catalyst activation temperature. However, the switching of the control of the low flow rate reduction treatment may also be performed based on a predetermined temperature that is determined in advance and close to the catalyst activation temperature. Examples of the predetermined temperature determined in advance include the temperature of the boundary between a case where the $O_2/C$ at which the $NO_x$ removal rate reaches its peak exceeds zero and a case where the $O_2/C$ at which the $NO_x$ removal rate reaches its peak is zero.

Figure 5:
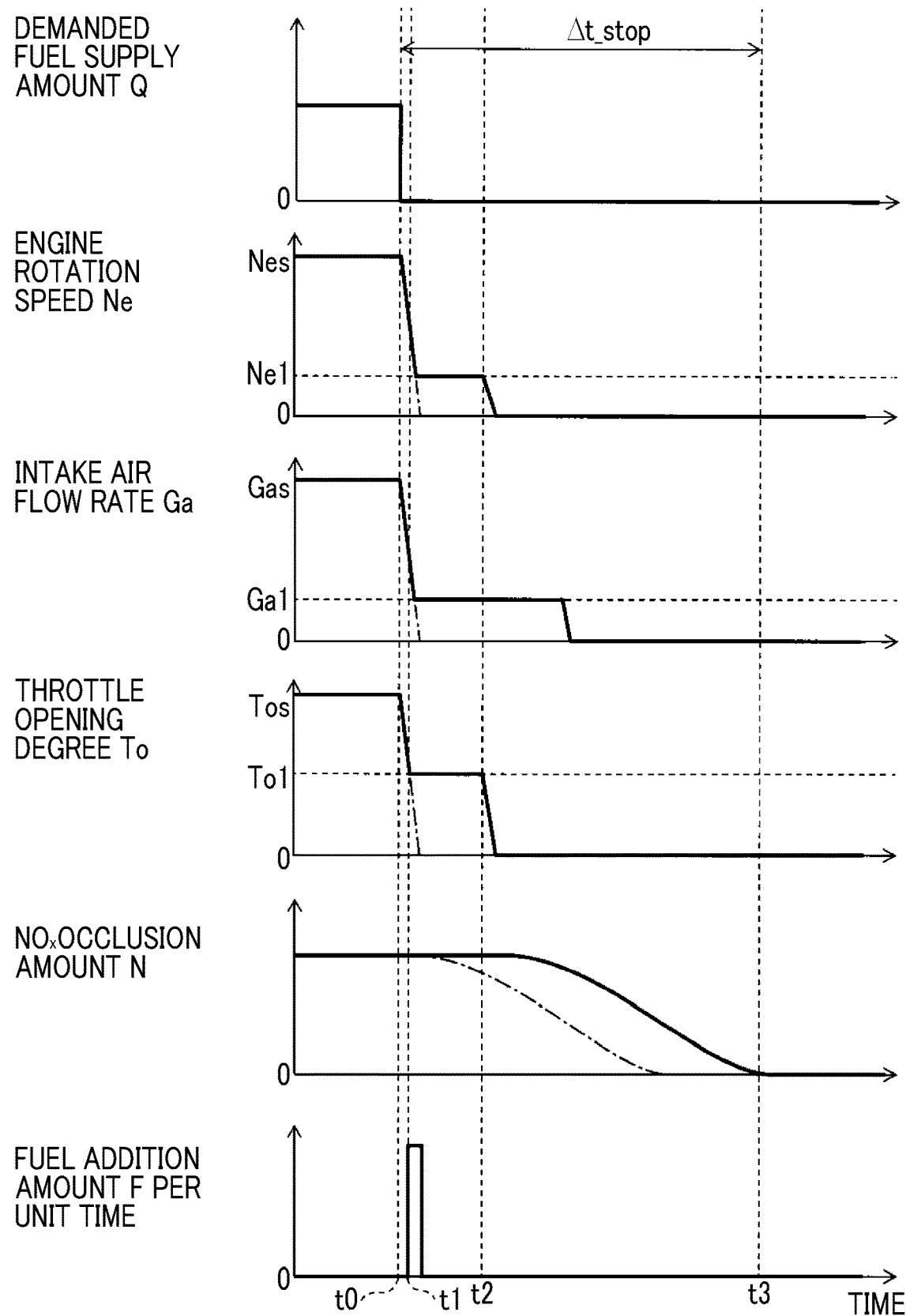
FIG. 5 is a timing chart of the low flow rate reduction treatment according to the first example.

FIG. 5 is a timing chart of the low flow rate reduction treatment according to the first example of the present disclosure. Time changes in the demanded fuel supply amount Q, the engine rotation speed Ne, the intake air flow rate Ga, the throttle opening degree To, the $NO_x$ occlusion amount N of the NOx occlusion reduction catalyst 6, and the fuel addition amount F per unit time are shown in FIG. 5.

The solid line represent a case where the temperature of the NOx occlusion reduction catalyst 6 is lower than the catalyst activation temperature and is 250° C., and the one-dot chain line represents a case where the temperature of the NOx occlusion reduction catalyst 6 is higher than the catalyst activation temperature and is 350° C.

In the first example, control similar to that illustrated in FIG. 3 is performed in a case where the temperature of the NOx occlusion reduction catalyst 6 is higher than the catalyst activation temperature. In the example that is illustrated in FIG. 5, an idle operation is performed before the fuel injection from the injector 4 is stopped at time t0. Accordingly, before time t0, the throttle opening degree To is a throttle opening degree Tos during the idle operation. As indicated by the one-dot chain line in FIG. 5, once the fuel injection from the injector 4 is stopped at time t0, the throttle opening degree To is reduced at once from Tos to zero. After time t0, the flow rate of the exhaust gas supplied to the NOx occlusion reduction catalyst 6 begins to decrease with a decline in the engine rotation speed Ne. Fuel addition is performed from the fuel addition valve 7 at time t1 during the decline in the throttle opening degree To. The fuel that is added from the fuel addition valve 7 is flushed by the exhaust gas and reaches the NOx occlusion reduction catalyst 6 after some time elapses from time t1. By the time when the fuel added from the fuel addition valve 7 reaches the NOx occlusion reduction catalyst 6, the flow rate of the exhaust gas is already sufficiently low, and thus time for a reaction between the $NO_x$ and the fuel added from the fuel addition valve 7 is ensured and the $NO_x$ is removed. The low flow rate reduction treatment is terminated at time t3. The timing at which the low flow rate reduction treatment is terminated is determined such that time needed for $NO_x$ reduction can be ensured when the $NO_x$ occlusion amount is the maximum amount of the $NO_x$ amount that allows removal by the low flow rate reduction treatment. In the first example, the fuel supply from the injector 4 remains stopped while the low flow rate reduction treatment continues despite the ignition switch being switched to ON and resumption of the fuel supply is allowed after the low flow rate reduction treatment is terminated.

In the first example, the engine rotation speed Ne falls and the intake air flow rate Ga also falls after time t0, at which the fuel injection from the injector 4 is stopped, as indicated by the solid line in FIG. 5 in a case where the temperature of the NOx occlusion reduction catalyst 6 is lower than the catalyst activation temperature. In the first example, the throttle opening degree To is decreased from Tos after time t0 and reaches a first throttle opening degree To1 at time t1. As the throttle opening degree To changes from Tos to To1 as described above, the engine rotation speed Ne falls from an engine rotation speed Nes during the idle operation to a first engine rotation speed Ne1 and the intake air flow rate Ga measured by the air flow meter 31 also falls from an intake air flow rate Gas in an initial state to a first intake air flow rate Ga1.

In the first example, the throttle opening degree To reaches the first throttle opening degree To1 at time t1 and the fuel is added from the fuel addition valve 7 at time t1. Upon reaching the first throttle opening degree To1, the throttle opening degree To is maintained at the first throttle opening degree To1 for a certain period. Subsequently, the throttle opening degree To falls again from time t2 and reaches zero soon after being maintained for the certain period. In conjunction with the above, the intake air flow rate Ga also falls to zero after being maintained at the first intake air flow rate Ga1 for a certain period of time. In the example that is illustrated in FIG. 5, the intake air flow rate Ga becomes zero belatedly after the throttle opening degree To becomes zero, and this is because of a response delay attributable to the throttle valve 2 and the air flow meter 31 being at a distance from each other.

The total amount of the oxygen that is supplied to the NOx occlusion reduction catalyst 6 increases as the throttle opening degree To increases. Accordingly, once the throttle opening degree To is controlled so as to be reduced in stages after the fuel injection from the injector 4 is stopped, the total amount of the oxygen that is supplied to the NOx occlusion reduction catalyst 6 increases compared to a case where the throttle opening degree To is controlled so as to become zero at once. In the first example, the throttle opening degree To is controlled so as to be reduced in stages, by the throttle opening degree To being temporarily maintained at the first throttle opening degree To1, in a case where the temperature of the NOx occlusion reduction catalyst 6 is lower than the catalyst activation temperature. As a result, the total amount of the air that is supplied to the NOx occlusion reduction catalyst 6 during the low flow rate reduction treatment can be larger than in a case where the throttle opening degree To is reduced to zero at once. Accordingly, the total amount of the oxygen can be increased, and thus the $O_2/C$ can be increased.

The total amount of the air that is supplied to the NOx occlusion reduction catalyst 6 can be controlled by the magnitude of the first throttle opening degree that is temporarily maintained and the length of time for which the throttle opening degree is temporarily maintained at the first throttle opening degree. Accordingly, the total amount of the oxygen that is supplied to the NOx occlusion reduction catalyst 6 can be controlled. During the low flow rate reduction treatment according to the first example, the $NO_x$ removal rate is increased, by the $O_2/C$ being controlled such that the $O_2/C$ approaches 1, in a case where the temperature of the NOx occlusion reduction catalyst 6 is lower than the catalyst activation temperature.

In the first example, the total fuel addition amount from the fuel addition valve 7 and the total amount of the oxygen supplied to the NOx occlusion reduction catalyst 6 are set in the following manner as an example. The total fuel addition amount during the low flow rate reduction treatment is set based on the $NO_x$ occlusion amount N of the NOx occlusion reduction catalyst 6. The amount of the fuel that is needed for complete $NO_x$ reduction increases as the $NO_x$ occlusion amount N increases, and thus the total fuel addition amount is set to increase as the $NO_x$ occlusion amount N increases. The total fuel addition amount is the time-integrated amount of the fuel addition amount F per unit time illustrated in FIG. 5.

The total amount of the oxygen supplied to the NOx occlusion reduction catalyst 6 is set based on the total fuel addition amount such that the $O_2/C$ approaches 1. Specifically, the intake air flow rate Ga is set such that the $O_2$ with the same total mol number as the C that can be calculated from the total fuel addition amount can be supplied to the NOx occlusion reduction catalyst 6. The intake air flow rate Ga is controlled by the throttle valve 2.

Figure 6:
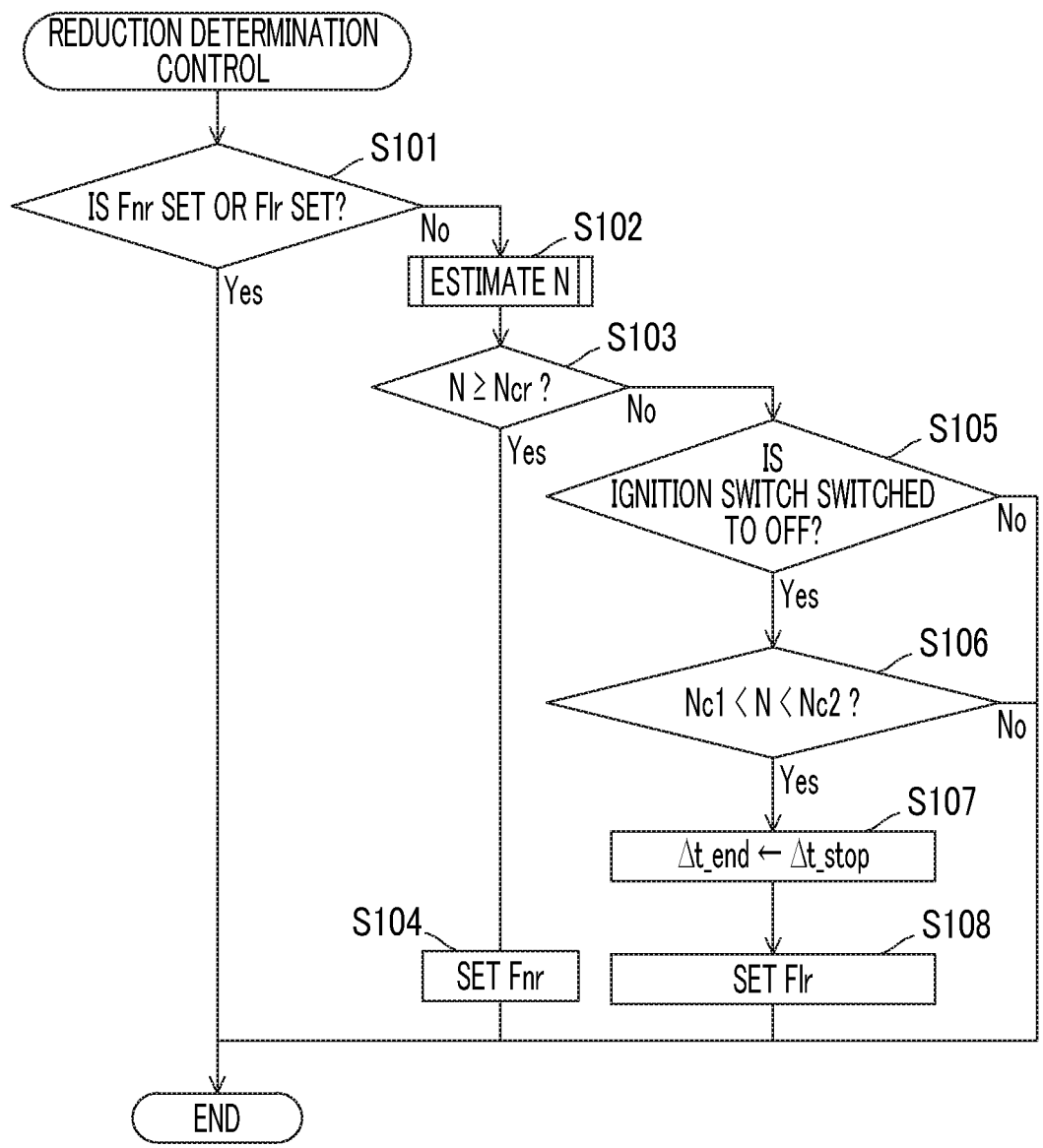
FIG. 6 is a flowchart relating to reduction determination control according to the first example.
Figure 7:
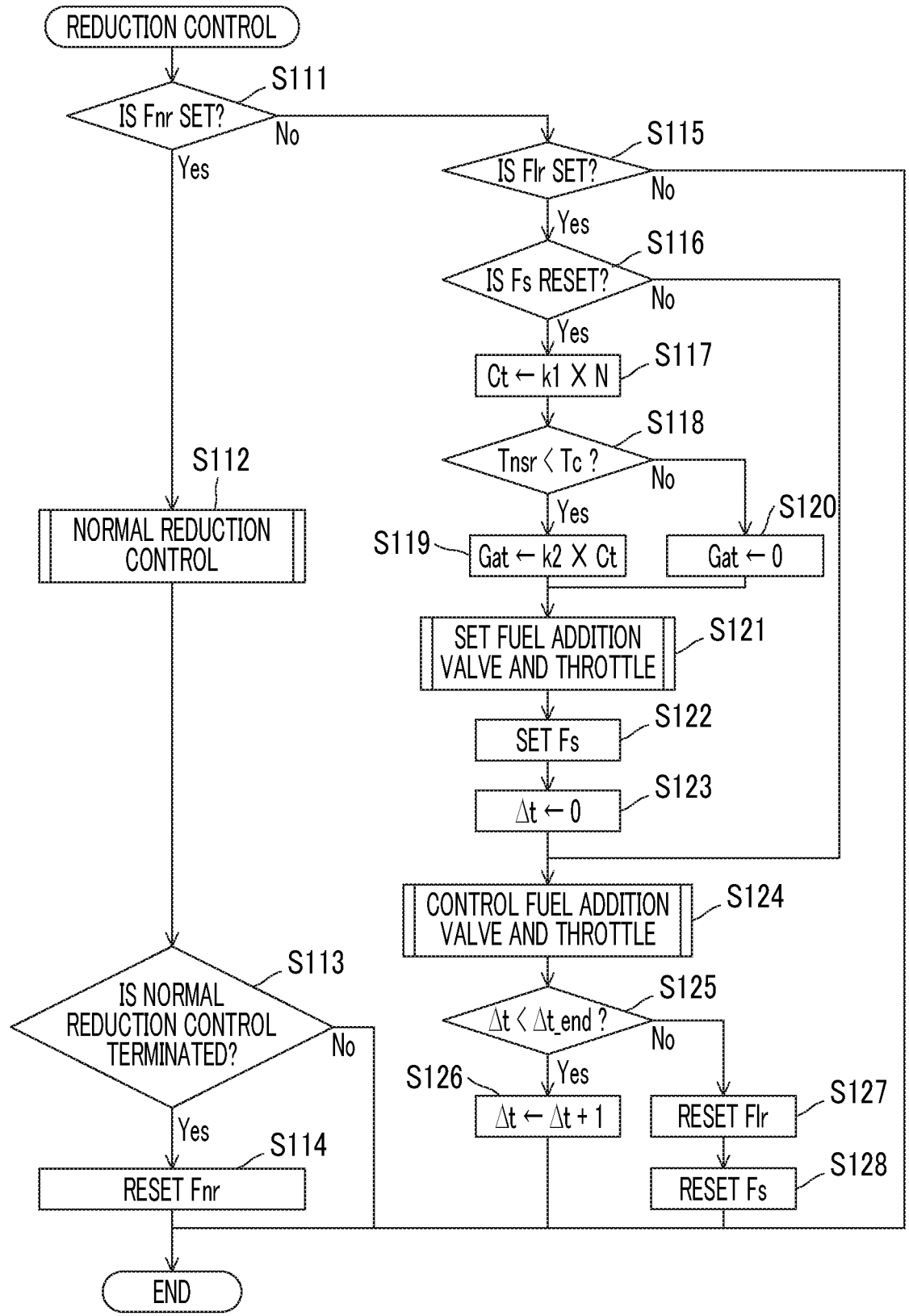
FIG. 7 is a flowchart relating to reduction control according to the first example.

The $NO_x$ removal processing according to the first example will be described below. In the first example, the low flow rate reduction treatment is performed in a case where the ignition switch is switched from ON to OFF. The control routine according to the first example includes the reduction determination control routine that is illustrated in FIG. 6 and the reduction control routine that is illustrated in FIG. 7. The reduction determination control (FIG. 6) is control for determining whether or not the $NO_x$ occluded in the NOx occlusion reduction catalyst 6 needs to be removed, and the reduction control (FIG. 7) is control for actually removing the occluded $NO_x$.

The reduction determination control will be described with reference to FIG. 6. The reduction determination control is repeatedly executed at regular intervals.

In Step S101, the electronic control unit 20 determines whether or not a normal reduction flag Fnr or a low flow rate reduction flag Flr is set. The normal reduction flag Fnr and the low flow rate reduction flag Flr are flags set when the $NO_x$ removal processing is in progress. Especially, the normal reduction flag Fnr is a flag set when the normal reduction treatment is performed and the low flow rate reduction flag Flr is a flag set when the low flow rate reduction treatment is performed. In a case where the electronic control unit 20 determines in Step S101 that the normal reduction flag Fnr or the low flow rate reduction flag Flr is set, it is obvious that $NO_x$ removal is already performed and the electronic control unit 20 does not have to determine whether or not $NO_x$ removal is needed, and thus the processing of this routine is terminated. In a case where the electronic control unit 20 determines that the normal reduction flag Fnr or the low flow rate reduction flag Flr is not set, the routine proceeds to Step S102 so that the electronic control unit 20 determines whether or not NOR removal is needed.

In Step S102, the electronic control unit 20 estimates the $NO_x$ occlusion amount N of the NOx occlusion reduction catalyst 6. The NOR occlusion amount N is proportional to a fuel consumption amount. Accordingly, in the first example, the electronic control unit 20 estimates the $NO_x$ occlusion amount N based on, for example, the fuel consumption amount from the previous removal processing. During the estimation of the $NO_x$ occlusion amount N, a known method other than the estimation method based on the fuel consumption amount can be used as well. This routine proceeds to Step S103 once the processing of Step S102 is over.

In Step S103, the electronic control unit 20 determines whether or not the estimated $NO_x$ occlusion amount N is equal to or greater than a predetermined limit $NO_x$ occlusion amount Ncr. The limit $NO_x$ occlusion amount Ncr is the maximum value of the amount of the $NO_x$ that can be occluded in the NOx occlusion reduction catalyst 6 or a predetermined value less than the maximum value and is a constant value determined for each NOx occlusion reduction catalyst 6. In a case where the electronic control unit 20 determines in Step S103 that the $NO_x$ occlusion amount N is equal to or greater than the limit $NO_x$ occlusion amount Ncr, the routine proceeds to Step S104 so that the normal reduction treatment is performed. In a case where the electronic control unit 20 determines that the $NO_x$ occlusion amount N is less than the limit $NO_x$ occlusion amount Ncr, the routine proceeds to Step S105.

In Step S104, the electronic control unit 20 terminates this routine after setting the normal reduction flag Fnr representing that the normal reduction treatment is performed. Once the normal reduction flag Fnr is set, the normal reduction treatment is performed during the reduction control (FIG. 7).

In Step S105, the electronic control unit 20 determines whether or not the ignition switch is switched from ON to OFF. In a case where the electronic control unit 20 determines in Step S105 that the ignition switch is switched to OFF, the routine proceeds to Step S106. In a case where the ignition switch is not switched from ON to OFF, the electronic control unit 20 determines that the low flow rate reduction treatment is impossible and terminates the processing of this routine without performing the $NO_x$ removal processing.

In Step S106, the electronic control unit 20 determines whether or not the $NO_x$ occlusion amount N is between a first lower limit value Nc1 and a first upper limit value Nc2. The first lower limit value Nc1 is the lower limit value of the $NO_x$ occlusion amount N for performing the low flow rate reduction treatment, and the first upper limit value Nc2 is the upper limit value of the $NO_x$ occlusion amount N for performing the low flow rate reduction treatment. In the first example, the first lower limit value Nc1 of the $NO_x$ occlusion amount N is set to a value at which the frequency of the low flow rate reduction treatment does not become higher than needed. The first upper limit value Nc2 of the $NO_x$ occlusion amount N is determined based on the maximum value of the amount of the air that can be supplied to the NOx occlusion reduction catalyst 6 when the low flow rate reduction treatment is executed. In other words, the first upper limit value Nc2 corresponds to the maximum value of the amount of the $NO_x$ that can be removed by the low flow rate reduction treatment.

The routine proceeds to Step S107 in a case where the electronic control unit 20 determines in Step S106 that the $NO_x$ occlusion amount N is a value between the first lower limit value Nc1 and the first upper limit value Nc2. The electronic control unit 20 terminates the processing of this routine without performing the $NO_x$ removal processing in a case where the electronic control unit 20 determines that the $NO_x$ occlusion amount N is equal to or less than the first lower limit value Nc1 or is equal to or greater than the first upper limit value Nc2.

In Step S107, the electronic control unit 20 substitutes a predetermined time Δt_stop for an execution time Δt_end of the low flow rate reduction treatment. For example, the predetermined time (first execution time) Δt_stop is time sufficient for removing the $NO_x$ by the first upper limit value Nc2. The predetermined time Δt_stop may be set to increase as the $NO_x$ occlusion amount N increases. In Step S108, the electronic control unit 20 sets the low flow rate reduction flag Flr. The processing of this routine is terminated once the processing of Step S108 is terminated.

The reduction control for $NO_x$ removal will be described with reference to FIG. 7. The reduction control is repeatedly executed at regular intervals.

In Step S111, the electronic control unit 20 determines whether or not the normal reduction flag Fnr is set. In a case where the electronic control unit 20 determines in Step S111 that the normal reduction flag Fnr is set, this routine proceeds to Step S112 so that the normal reduction treatment is executed. This routine proceeds to Step S115 in a case where the electronic control unit 20 determines that the normal reduction flag Fnr is not set.

In Step S112, the electronic control unit 20 executes normal reduction control for executing the normal reduction treatment. The normal reduction treatment is as described above, and thus detailed description thereof will be omitted.

In Step S113, the electronic control unit 20 determines whether or not the normal reduction control is terminated. In the first example, the electronic control unit 20 determines whether or not the normal reduction control is terminated based on whether or not the $NO_x$ occlusion amount N is below a $NO_x$ occlusion amount determined in advance. Accordingly, in a case where the $NO_x$ occlusion amount N is below the $NO_x$ occlusion amount determined in advance, the electronic control unit 20 determines that the normal reduction treatment is terminated and this routine proceeds to Step S114. In a case where the electronic control unit 20 determines that the normal reduction control is not terminated yet, this routine is terminated with the normal reduction treatment continuing.

In Step S114, the electronic control unit 20 resets the normal reduction flag Fnr. By the normal reduction flag Fnr being reset, the normal reduction treatment is not performed until the normal reduction flag Fnr is set again by Step S111. This routine is terminated once the processing of Step S114 is terminated.

In Step S115, the electronic control unit 20 determines whether or not the low flow rate reduction flag Flr is set. The routine proceeds to Step S116 in a case where the electronic control unit 20 determines in Step S115 that the low flow rate reduction flag Flr is set. The processing of this routine is terminated without the $NO_x$ removal processing being performed in a case where the electronic control unit 20 determines in Step S115 that the low flow rate reduction flag Flr is not set.

In Step S116, the electronic control unit 20 determines whether or not a setting flag Fs is set. The setting flag Fs is a flag set in a case where initial setting for the low flow rate reduction treatment is terminated. In a case where the electronic control unit 20 determines in Step S116 that the setting flag Fs is not set, the routine proceeds to Step S117 so that the initial setting of the low flow rate reduction treatment is performed. In a case where the electronic control unit 20 determines in Step S116 that the setting flag Fs is set, the electronic control unit 20 determines that the initial setting for the low flow rate reduction treatment is terminated and the routine proceeds to Step S124.

In Step S117, the electronic control unit 20 calculates a target total fuel addition amount Ct for addition from the fuel addition valve 7 by multiplying the $NO_x$ occlusion amount N by a coefficient k1. A value experimentally determined in advance can be used as the coefficient k1. In Step S118, the electronic control unit 20 determines whether or not a temperature Tnsr of the NOx occlusion reduction catalyst 6 detected by the temperature sensor 32 is below a catalyst activation temperature Tc. In the first example, the catalyst activation temperature Tc is 300° C. The routine proceeds to Step S119 in a case where the electronic control unit 20 determines in Step S118 that the temperature Tnsr is below the catalyst activation temperature Tc, and the routine proceeds to Step S120 in a case where the electronic control unit 20 determines in Step S118 that the temperature Tnsr is equal to or higher than the catalyst activation temperature Tc.

In Step S119, the electronic control unit 20 calculates a target intake air flow rate Gat by multiplying the target total fuel addition amount Ct by a coefficient k2. By the target intake air flow rate Gat being controlled as described above, the total amount of the oxygen that is supplied to the NOx occlusion reduction catalyst 6 is controlled as well. A value experimentally determined in advance can be used as the coefficient k2. This routine proceeds to Step S121 after Step S120. The coefficient k2 according to the first example is a coefficient that is determined based on the $O_2/C$ which is advantageous for $NO_x$ removal during the low flow rate reduction treatment. In a case where the $NO_x$ removal rate and the $O_2/C$ have the relationship that is illustrated in FIG. 4B, for example, the coefficient k2 is determined such that the $O_2/C$ becomes 1.

In Step S120, the electronic control unit 20 sets the target intake air flow rate Gat to zero. This routine proceeds to Step S121 after Step S120.

In Step S121, the electronic control unit 20 sets a control method for the fuel addition valve 7 based on the target total fuel addition amount Ct. The electronic control unit 20 sets the opening degree To of the throttle valve 2 based on the target intake air flow rate Gat.

In Step S122, the electronic control unit 20 sets the setting flag Fs. In Step S123, the electronic control unit 20 sets a timer Δt for recording the time of execution of the low flow rate reduction treatment to zero. This routine proceeds to Step S124 once the initial setting of the low flow rate reduction treatment is terminated by Step S117 to Step S123 described above.

In Step S124, the electronic control unit 20 controls the fuel addition valve 7 and the throttle valve 2 as set in Step S121. In Step S125, the electronic control unit 20 determines whether or not the timer Δt is smaller than the execution time Δt_end of the low flow rate reduction treatment. In a case where the electronic control unit 20 determines in Step S125 that the timer Δt is smaller than the execution time Δt_end of the low flow rate reduction treatment, this routine proceeds to Step S126, the timer Δt is incremented, and then the processing is terminated. In a case where the electronic control unit 20 determines in Step S125 that the timer Δt is at least the execution time Δt_end of the low flow rate reduction treatment, this routine proceeds to Step S127 and the low flow rate reduction flag Flr is reset in Step S127. The processing of this routine is terminated after the setting flag Fs is reset in Step S128.

As described above, the exhaust gas control apparatus for an internal combustion engine according to the first example is provided with the injector 4 (fuel injection device) supplying the fuel to the combustion chamber 3 of the internal combustion engine and the NOx occlusion reduction catalyst 6 disposed on the exhaust passage 5. The exhaust gas control apparatus for an internal combustion engine is provided with the fuel addition valve 7 disposed on the exhaust passage 5 and on the upstream side of the NOx occlusion reduction catalyst 6 in the direction in which the exhaust gas flows and adding the fuel to the NOx occlusion reduction catalyst 6, the throttle valve 2 (inflow gas adjustment device) capable of adjusting the amount of the fresh gas that is supplied to the NOx occlusion reduction catalyst 6, and the electronic control unit 20 controlling the injector 4, the fuel addition valve 7, and the throttle valve 2. The electronic control unit 20 is capable of executing the low flow rate reduction treatment as processing for removing the $NO_x$ occluded in the NOx occlusion reduction catalyst 6 by adding the fuel from the fuel addition valve 7 to the NOx occlusion reduction catalyst 6 when the fuel supply from the injector 4 is stopped and the flow rate of the exhaust gas supplied to the NOx occlusion reduction catalyst 6 is smaller than during the operation of the internal combustion engine. When the temperature Tnsr of the NOx occlusion reduction catalyst 6 is below the catalyst activation temperature Tc (predetermined temperature determined in advance) during the low flow rate reduction treatment, the throttle valve 2 is controlled such that the $O_2/C$ (ratio of the oxygen to the fuel added to the NOx occlusion reduction catalyst 6) becomes higher compared to when the temperature Tnsr of the NOx occlusion reduction catalyst 6 is equal to or higher than the catalyst activation temperature Tc.

With the exhaust gas control apparatus for an internal combustion engine as described above, the $NO_x$ occluded in the NOx occlusion reduction catalyst 6 can be appropriately released and removed and deterioration of fuel economy can be suppressed at the same time. In other words, in the exhaust gas control apparatus for an internal combustion engine according to the first example, the low flow rate reduction treatment is executed even in a case where the temperature of the NOx occlusion reduction catalyst 6 is below the catalyst activation temperature in addition to the normal reduction treatment performed in a case where the temperature of the NOx occlusion reduction catalyst 6 is equal to or higher than the catalyst activation temperature. The $NO_x$ can be appropriately removed since the $O_2/C$ is appropriately controlled by the low flow rate reduction treatment as well. The frequency of execution of the normal reduction treatment in which the fuel is consumed for a rise in temperature can be reduced by the low flow rate reduction treatment being performed. Accordingly, with the exhaust gas control apparatus for an internal combustion engine according to the first example, deterioration of fuel economy can be suppressed.

In a case where the low flow rate reduction treatment is performed in a state where the temperature of the NOx occlusion reduction catalyst 6 is below the catalyst activation temperature (predetermined temperature), the electronic control unit 20 controls the fuel addition valve 7 such that the fuel is added by the total fuel addition amount calculated based on the $NO_x$ occlusion amount N of the NOx occlusion reduction catalyst 6 and controls the throttle valve 2 (inflow gas adjustment device) such that the oxygen is supplied to the NOx occlusion reduction catalyst 6 by the total amount of the oxygen calculated based on the amount of the fuel added from the fuel addition valve 7.

During the low flow rate reduction treatment, almost the entire occluded $NO_x$ is released into the exhaust gas from the NOx occlusion reduction catalyst 6. Accordingly, a fuel outflow from the $NO_x$ occlusion reduction catalyst 6 can be suppressed and, at the same time, the $NO_x$ removal by the fuel can be sufficiently performed by the fuel being added without excess or deficiency in accordance with the $NO_x$ occlusion amount N.

The throttle valve 2 (inflow gas adjustment device) is capable of adjusting the intake air flow rate. In a case where the low flow rate reduction treatment is performed in a state where the temperature Tnsr of the NOx occlusion reduction catalyst 6 is below the catalyst activation temperature (predetermined temperature) Tc, the electronic control unit 20 controls the opening degree of the throttle valve 2 such that the total amount of the air that is supplied to the NOx occlusion reduction catalyst 6 after the fuel supply is stopped is larger compared to a case where the low flow rate reduction treatment is not performed.

A large amount of oxygen is supplied to the NOx occlusion reduction catalyst 6 in a case where the temperature Tnsr of the NOx occlusion reduction catalyst 6 is below the catalyst activation temperature Tc. Accordingly, CO is likely to be generated in the NOx occlusion reduction catalyst 6, and thus the $NO_x$ removal can be promoted.

The throttle valve 2 (inflow gas adjustment device) is capable of adjusting the intake air flow rate Ga. When the temperature Tnsr of the NOx occlusion reduction catalyst 6 is below the catalyst activation temperature Tc (predetermined temperature) in a case where the low flow rate reduction treatment is performed, the electronic control unit 20 controls the opening degree of the throttle valve 2, such that the opening degree of the throttle valve 2 is reduced in stages, after the fuel supply from the injector 4 (fuel injection device) is stopped. When the temperature Tnsr of the NOx occlusion reduction catalyst 6 is equal to or higher than the catalyst activation temperature Tc (predetermined temperature), the electronic control unit 20 controls the opening degree of the throttle valve 2, such that the opening degree of the throttle valve 2 reaches zero at once, after the fuel supply from the injector 4 is stopped.

By the opening degree of the throttle valve 2 being controlled such that the opening degree of the throttle valve 2 is reduced in stages, the total amount of the oxygen supplied to the NOx occlusion reduction catalyst 6 can be adjusted in a simple and highly controllable manner. In a case where the opening degree of the throttle valve 2 is gradually lowered in conjunction with the low flow rate reduction treatment, for example, the opening degree lower method varies with the throttle opening degree To at the initiation of the low flow rate reduction treatment even at the same target oxygen amount Ot, and thus the control is cumbersome. In a case where the throttle opening degree To is controlled so as to be reduced in stages as described above, in contrast, the total amount of the oxygen supplied to the NOx occlusion reduction catalyst 6 can be controlled irrespective of the magnitude of the throttle opening degree To at the initiation of the low flow rate reduction treatment.

The electronic control unit 20 performs the low flow rate reduction treatment in a case where the $NO_x$ occlusion amount N of the NOx occlusion reduction catalyst 6 is smaller than the amount of the $NO_x$ that can be removed by the low flow rate reduction treatment (upper limit value determined in advance) when the fuel supply from the injector 4 is stopped.

According to the first example, the low flow rate reduction treatment is performed merely in a case where the $NO_x$ occlusion amount of the NOx occlusion reduction catalyst 6 is smaller than the amount of the $NO_x$ that can be removed by the low flow rate reduction treatment. Accordingly, $NO_x$ flowing out downstream of the NOx occlusion reduction catalyst 6 in the direction in which the exhaust gas flows without being removed by the low flow rate reduction treatment can be suppressed.

The predetermined temperature Tc may be the catalyst activation temperature as well. During the normal reduction control in Step S112, the target temperature of the NOx occlusion reduction catalyst 6 is set equal to or higher than the catalyst activation temperature.

In a case where the low flow rate reduction treatment is performed in a state where the temperature Tnsr of the NOx occlusion reduction catalyst 6 is below the catalyst activation temperature Tc (predetermined temperature), the electronic control unit 20 controls the throttle valve 2 (inflow gas adjustment device) such that the $O_2/C$ (ratio of the oxygen to the fuel added to the NOx occlusion reduction catalyst 6) becomes a ratio at which the amount of the fuel that is added from the fuel addition valve 7 and converted to CO in the NOx occlusion reduction catalyst 6 is equal to or greater than a predetermined amount.

As described above, the CO is higher in $NO_x$ reactivity than the HC, and thus the $NO_x$ removal rate is increased by the throttle valve 2 being controlled such that the amount of the conversion to the CO is equal to or greater than the predetermined amount.

In the case of the $O_2/C$—$NO_x$ removal rate relationship that is illustrated in FIG. 4B, for example, the $NO_x$ removal rate is high when the $O_2/C$ has a range of 0.2 to 1.6 (range indicated by the arrow). It is conceivable that this is because, in the example that is illustrated in FIG. 4B, the amount of the fuel that is added from the fuel addition valve 7 and converted to the CO in the NOx occlusion reduction catalyst 6 becomes equal to or greater than the predetermined amount when the $O_2/C$ ranges from 0.2 to 1.6. Accordingly, in the NOx occlusion reduction catalyst 6 that has the $O_2/C$—$NO_x$ removal rate relationship illustrated in FIG. 4B, the ratio at which the amount of the fuel that is added from the fuel addition valve 7 and converted to the CO in the NOx occlusion reduction catalyst 6 becomes equal to or greater than the predetermined amount means the $O_2/C$ range of 0.2 to 1.6.

Second Example

An exhaust gas control apparatus for an internal combustion engine according to a second example will be described with reference to FIGS. 8 and 9. The configuration and control of the exhaust gas control apparatus for an internal combustion engine according to the second example are highly similar to those of the first example, and thus the following description will focus on how the two examples differ from each other.

As described above, the low flow rate reduction treatment is performed by the fuel addition valve 7 adding the fuel when the fuel supply from the injector 4 is stopped. When no fuel is supplied as described above includes when the ignition switch is switched to OFF as in the first example, when a vehicle decelerates, and, in a hybrid vehicle, when EV traveling is performed for the vehicle to be driven solely with the power of an electric motor for driving. Accordingly, the low flow rate reduction treatment may be performed during vehicle deceleration and so on as well. In the second example of the present disclosure, the low flow rate reduction treatment is performed when fuel supply is stopped in conjunction with vehicle deceleration (hereinafter, the control described above will be referred to as "fuel cut control").

Figure 8:
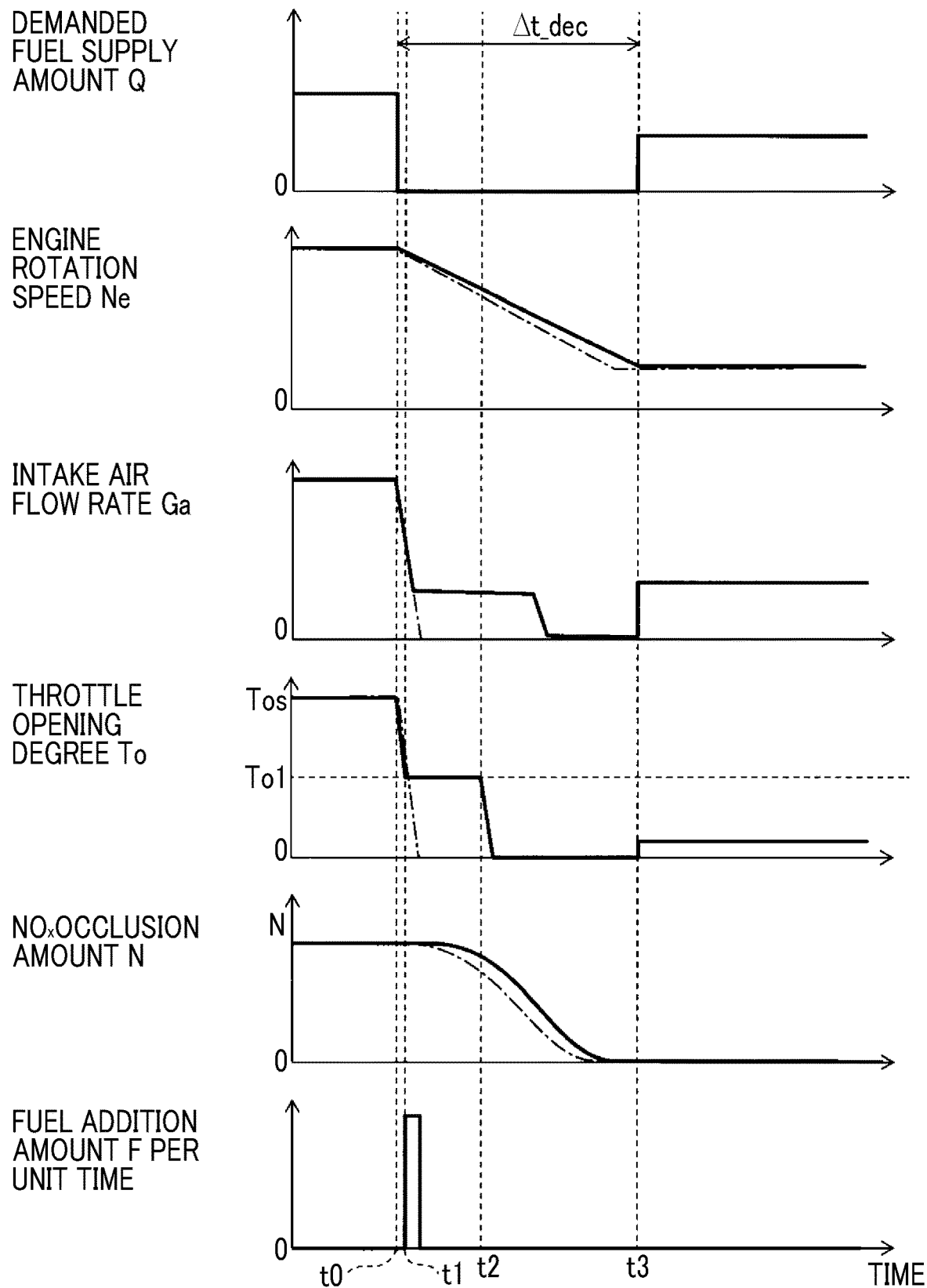
FIG. 8 is a timing chart of a low flow rate reduction treatment according to a second example.
Figure 9:
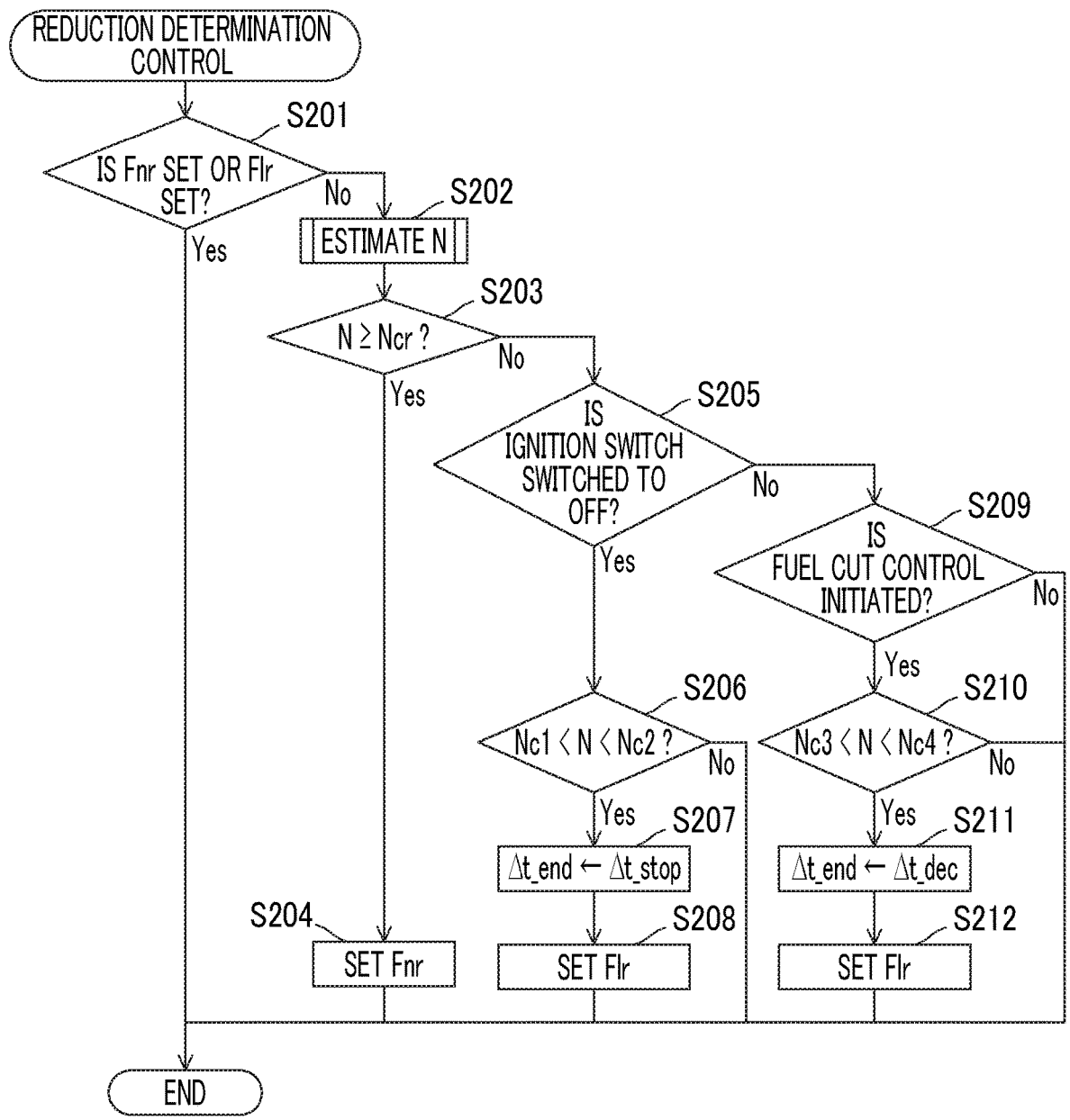
FIG. 9 is a flowchart relating to reduction determination control according to the second example.

FIG. 8 is a timing chart relating to the low flow rate reduction treatment according to the second example of the present disclosure. The one-dot chain lines in FIG. 8 represent time changes in the demanded fuel supply amount Q, the engine rotation speed Ne, the intake air flow rate Ga, the throttle opening degree To, the $NO_x$ occlusion amount N, and the fuel addition amount F per unit time in a case where the low flow rate reduction treatment is performed when the temperature of the NOx occlusion reduction catalyst 6 is equal to or higher than the catalyst activation temperature. In a case where the temperature of the NOx occlusion reduction catalyst 6 is equal to or higher than the catalyst activation temperature, the low flow rate reduction treatment is executed in a state where the total amount of the oxygen that is supplied to the NOx occlusion reduction catalyst 6 is kept at a minimum when the fuel cut control is performed. Accordingly, in the case described above, the fuel is added from the fuel addition valve 7 after the opening degree of the throttle valve 2 reaches zero at once. The low flow rate reduction treatment is terminated before the vehicle deceleration is terminated.

Returning from the fuel cut control is impossible during the execution of the low flow rate reduction treatment. This is because, although most of the $NO_x$ occluded in the NOx occlusion reduction catalyst 6 is released into the exhaust gas once the low flow rate reduction treatment is performed, the $NO_x$ released into the exhaust gas flows out from the NOx occlusion reduction catalyst 6 before being reduced in the NOx occlusion reduction catalyst 6 once returning from the fuel cut control precedes the termination of the low flow rate reduction treatment. Accordingly, even in a case where a driver depresses an accelerator and acceleration is requested immediately after the fuel cut control is performed and the low flow rate reduction treatment is executed, for example, no fuel can be supplied from the injector 4 and thus the vehicle cannot be accelerated until the low flow rate reduction treatment is terminated. Therefore, the responsiveness to the acceleration request is likely to decline as the period of the low flow rate reduction treatment lengthens. In the second example, an execution time (second execution time) Δt_dec of the low flow rate reduction treatment is set as a relatively short time not impairing the responsiveness. Therefore, the second execution time Δt_dec is set shorter than the first execution time Δt_stop according to the first example.

The solid lines in FIG. 8 represent a case where the low flow rate reduction treatment is performed when the temperature of the NOx occlusion reduction catalyst 6 is below the catalyst activation temperature. When the fuel cut control is performed, the throttle opening degree To is temporarily maintained at a certain throttle opening degree To and the fuel is added from the fuel addition valve 7 at the same time. Subsequently, the throttle opening degree To is turned into zero. In the second example, the low flow rate reduction treatment is executed in the manner described above. By the throttle opening degree To being temporarily maintained at To, the negative pressure between the throttle valve 2 and the combustion chamber 3 becomes small compared to a case where the opening degree of the throttle valve 2 is controlled such that the opening degree of the throttle valve 2 reaches zero at once, and thus the deceleration is gentle. In the second example, the low flow rate reduction treatment is terminated once the time of execution of the low flow rate reduction treatment reaches the second execution time Δt_dec, that is, time t3.

The solid lines in FIG. 8 represent a case where the acceleration request is made by the driver while the low flow rate reduction treatment is performed. In the case as described above, the fuel cut control continues and thus the demanded fuel supply amount Q is maintained at zero until time t3, at which the low flow rate reduction treatment is terminated. Once the fuel cut control is terminated at time t3, the demanded fuel supply amount Q is set to a value exceeding zero and the acceleration is allowed. Once the acceleration is allowed, each of the engine rotation speed Ne, the intake air flow rate Ga, and the throttle opening degree To becomes a value exceeding zero.

The reduction determination control according to the second example will be described with reference to FIG. 9. In the second example, the low flow rate reduction treatment is performed in a case where the fuel cut control is performed as well as a case where the fuel supply is stopped in conjunction with the ignition switch being switched to OFF.

Description of Step S201 to Step S204 will be omitted because Step S201 to Step S204 is similar to Step S101 to Step S104 according to the first example.

In Step S205, the electronic control unit 20 determines whether or not the ignition switch is switched to OFF. The routine proceeds to Step S206 in a case where the electronic control unit 20 determines in Step S205 that the ignition switch is switched to OFF. Description of Step S205 to Step S207 will be omitted because Step S205 to Step S207 is similar to Step S105 to Step S107 according to the first example. The routine proceeds to Step S209 in a case where the electronic control unit 20 determines in Step S205 that the ignition switch is not switched to OFF.

In Step S209, the electronic control unit 20 determines whether or not the fuel cut control is initiated. In a case where the electronic control unit 20 determines in Step S209 that the fuel cut control is initiated, the routine proceeds to Step S210 so that the electronic control unit 20 determines whether or not to execute the low flow rate reduction treatment. The processing of this routine is terminated in a case where the electronic control unit 20 determines that the fuel cut is not initiated. In the second example, the electronic control unit 20 may also determine whether or not the fuel cut control is initiated based on, for example, a flag set during the execution of the fuel cut control.

In Step S210, the electronic control unit 20 determines whether or not the $NO_x$ occlusion amount N is between a lower limit value Nc3 and an upper limit value Nc4. In a case where the electronic control unit 20 determines in Step S210 that the $NO_x$ occlusion amount N is between the lower limit value Nc3 and the upper limit value Nc4, the electronic control unit 20 determines that the low flow rate reduction treatment can be executed and the routine proceeds to Step S211. In a case where the electronic control unit 20 determines in Step S210 that the $NO_x$ occlusion amount N is equal to or less than the lower limit value Nc3 or is equal to or greater than the upper limit value Nc4, the electronic control unit 20 determines that the low flow rate reduction treatment cannot be executed and the processing of the routine is terminated. The lower limit value Nc3 of the $NO_x$ occlusion amount is set to a value at which the frequency of execution of the low flow rate reduction treatment does not become excessively high. The upper limit value Nc4 of the $NO_x$ occlusion amount is set to, for example, the amount of the $NO_x$ that can be maximally removed within the second execution time Δt_dec or an amount smaller than the $NO_x$ amount.

In Step S211, the electronic control unit 20 sets the second execution time Δt_dec described above as the execution time Δt_end of the low flow rate reduction treatment. Subsequently, the low flow rate reduction flag Flr is set in Step S212, and then the processing of this routine is terminated.

In other words, according to the second example, the upper limit value of the $NO_x$ occlusion amount set when the fuel injection from the injector 4 is stopped in conjunction with the ignition switch being switched to OFF (upper limit value Nc2 of the $NO_x$ occlusion amount) differs from the upper limit value of the $NO_x$ occlusion amount set when the fuel injection from the injector 4 is stopped in conjunction with the deceleration (upper limit value Nc4 of the $NO_x$ occlusion amount). The period during which the fuel supply from the injector 4 can be stopped is longer in the case of ignition switch OFF than the $NO_x$ removal amount in the case of deceleration, and thus the upper limit value Nc2 in the case of ignition switch OFF is set as a value exceeding the upper limit value Nc4 in the case of deceleration.

By the upper limit value of the $NO_x$ occlusion amount being set to different values depending on situations as described above, the execution time Δt_end of the low flow rate reduction treatment can be optimized depending on situations.

Third Example

A third example of the present disclosure using exhaust gas recirculation (EGR) will be described with reference to FIGS. 10 and 11. The configuration and control of an exhaust gas control apparatus for an internal combustion engine according to the third example are highly similar to those of the first and second examples, and thus the following description will focus on how the third example differs from the first and second examples.

Figure 10:
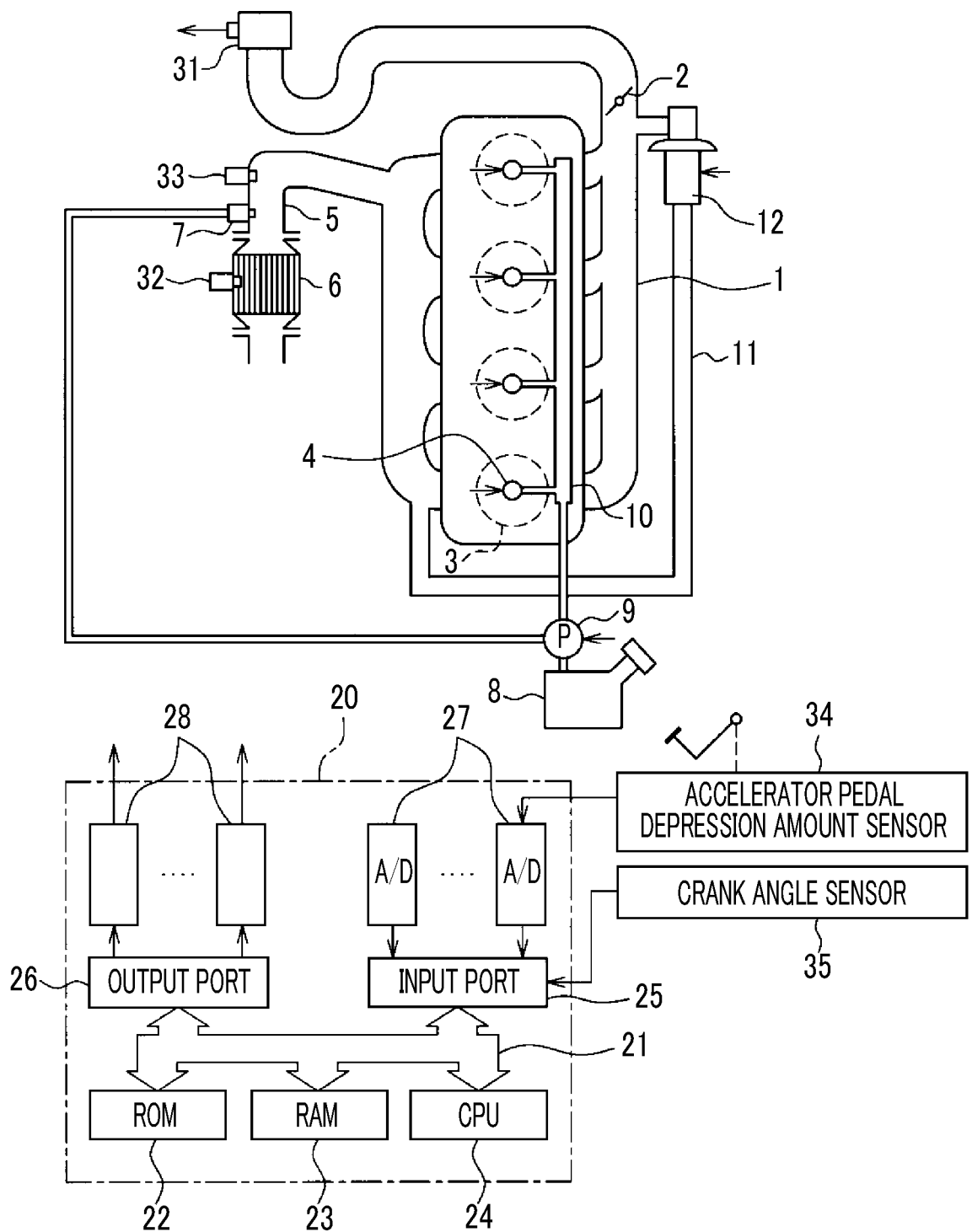
FIG. 10 is a schematic configuration diagram of an exhaust gas control apparatus for an internal combustion engine according to a third example.

FIG. 10 is a schematic diagram of the exhaust gas control apparatus for an internal combustion engine according to the third example. An exhaust recirculation device for exhaust gas recirculation is disposed in the exhaust gas control apparatus for an internal combustion engine according to the third example. The exhaust recirculation device is provided with an EGR passage 11 connecting the exhaust passage 5 and the intake passage 1 to each other and an EGR valve 12 for adjusting the passage sectional area of the EGR passage 11 in the EGR passage 11. The opening degree of the EGR valve 12 is controlled by the electronic control unit 20. The amount of the exhaust gas that is mixed with fresh gas is controlled in accordance with the opening degree of the EGR valve 12.

In the third example, the electronic control unit 20 adjusts the total amount of the oxygen that is supplied to the NOx occlusion reduction catalyst 6 by controlling the opening degrees of the throttle valve 2 and the EGR valve 12 when the temperature of the NOx occlusion reduction catalyst 6 is below the catalyst activation temperature.

The control of the $NO_x$ removal processing relating to the third example will be described. In the third example, whether or not to perform the $NO_x$ removal processing is determined by the reduction determination control that is illustrated in FIG. 9 and the low flow rate reduction treatment is executed by the low flow rate reduction control that is illustrated in FIG. 11.

Figure 11:
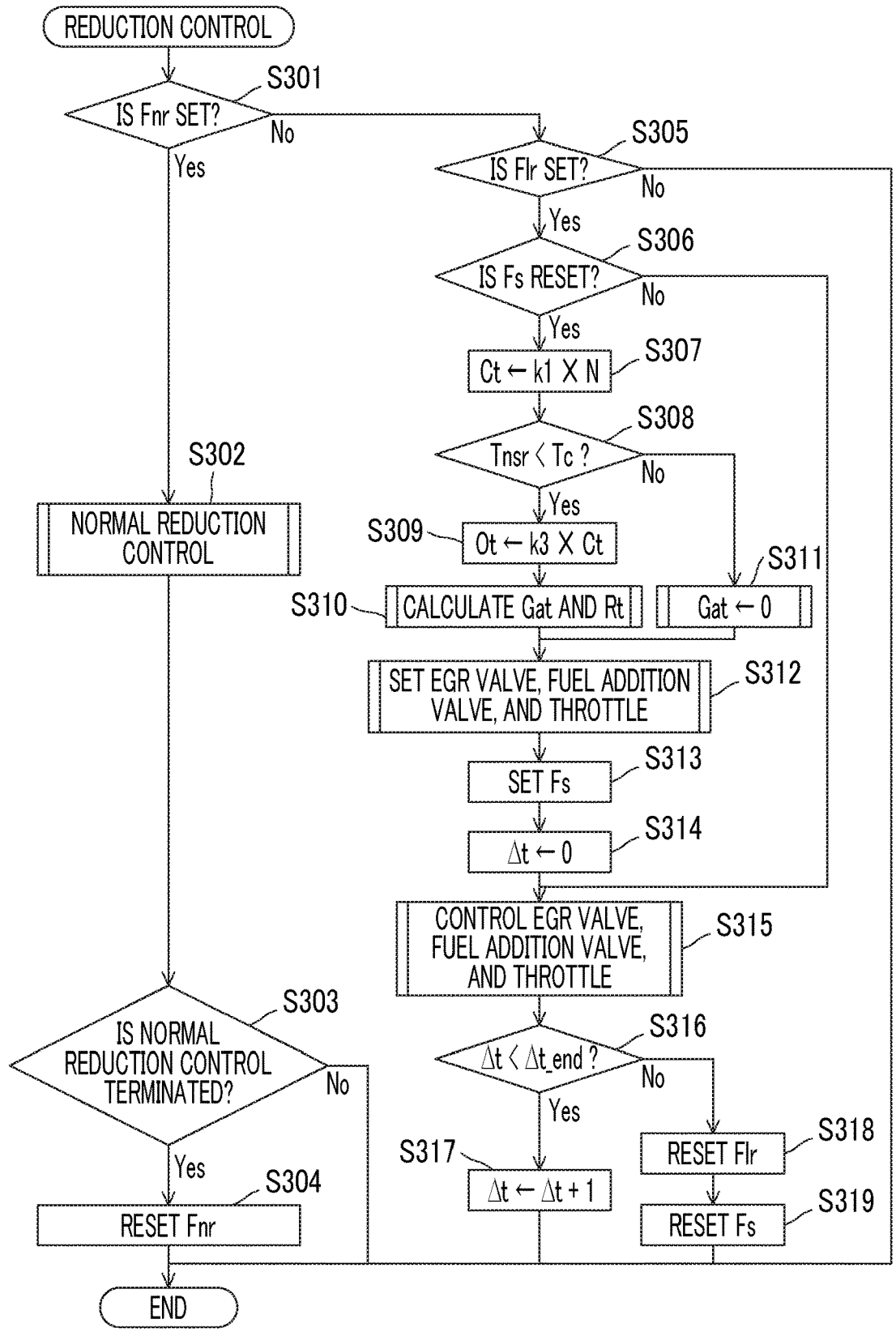
FIG. 11 is a flowchart relating to reduction control according to the third example.

FIG. 11 is a flowchart illustrating the reduction control according to the third example. The flowchart illustrated in FIG. 11 is repeatedly executed at regular intervals. Description of Step S301 to Step S308 and Step S311 in FIG. 11 will be omitted because Step S301 to Step S308 and Step S311 in FIG. 11 are similar to Step S111 to Step S118 and Step S120 in FIG. 7, respectively.

The routine proceeds to Step S309 in a case where the electronic control unit 20 determines in Step S308 that the temperature Tnsr of the $NO_x$ occlusion reduction catalyst 6 is below the catalyst activation temperature Tc. In Step S309, the electronic control unit 20 calculates the target oxygen amount Ot by multiplying the target total fuel addition amount Ct calculated in Step S307 by a coefficient k3.

In Step S310, the electronic control unit 20 calculates the target intake air flow rate Gat and a target EGR rate Rt based on the target oxygen amount Ot such that the $O_2/C$ of the exhaust gas reaches a target value (such as one). In other words, in the third example, the electronic control unit 20 adjusts the target intake air flow rate Gat and the target EGR rate Rt such that the same amount of oxygen as the target total fuel addition amount Ct is supplied to the NOx occlusion reduction catalyst 6.

The exhaust gas that is supplied to the intake passage 1 through the EGR passage 11 contains $O_2$ although the amount of the $O_2$ is slight. Accordingly, an EGR rate R and the intake air flow rate Ga are set such that the sum of the $O_2$ contained in fresh gas (air supplied from upstream of the throttle valve 2) and supplied to the NOx occlusion reduction catalyst 6 and the $O_2$ contained in the exhaust gas supplied to the intake passage 1 through the EGR passage 11 and supplied to the NOx occlusion reduction catalyst 6 is equal in amount to the carbon that is contained in the fuel which is supplied from the fuel addition valve 7. The amount of the oxygen in the exhaust gas supplied to the intake passage 1 may be obtained based on the oxygen concentration that is obtained from the air-fuel ratio sensor 33 as well. In the case described above, it is preferable that the air-fuel ratio sensor 33, for example, is disposed on the exhaust passage 5 and upstream of the NOx occlusion reduction catalyst 6. The intake air flow rate Ga and the EGR rate R are set in Step S310, and then the routine proceeds to Step S312.

In Step S312, the electronic control unit 20 sets the opening degree of the fuel addition valve 7, the opening degree To of the throttle valve 2, and the opening degree of the EGR valve 12 based on the target total fuel addition amount Ct, the target intake air flow rate Gat, and the target EGR rate Rt, respectively. In Step S313 and Step S314, the setting flag Fs is set and the timer Δt is cleared as in Step S122 and Step S123 according to the first example.

In Step S315, the throttle valve 2 controlling the fuel addition valve 7 and the throttle valve 2, the fuel addition valve 7, and the EGR valve 12 are controlled as set in Step S312. In the third example, the opening degree of the EGR valve 12 at a time when the low flow rate reduction treatment is executed is controlled such that the opening degree of the EGR valve 12 at that time exceeds zero for exhaust gas recirculation. Description of the processing that follows Step S316 will be omitted because it is similar to Step S125 to Step S128 according to the first example.

As described above, the exhaust gas control apparatus for an internal combustion engine according to the third example is provided with the exhaust recirculation device (external EGR device) that is provided with the EGR passage 11 allowing the exhaust passage 5 and the intake passage 1 of the internal combustion engine to communicate with each other and the EGR valve 12 disposed on the EGR passage 11 and the throttle valve 2 that is capable of adjusting the intake air flow rate Ga. Inflow gas adjustment devices are the throttle valve 2 and the exhaust recirculation device (external EGR device). When the temperature of the NOx occlusion reduction catalyst 6 is below the catalyst activation temperature (predetermined temperature) during the low flow rate reduction treatment, the electronic control unit 20 controls the opening degree of the EGR valve 12 such that the opening degree of the EGR valve 12 exceeds zero while controlling the opening degree of the throttle valve 2 such that the opening degree of the throttle valve 2 is reduced in stages after the fuel supply from the injector 4 is stopped.

According to the third example as described above, control accuracy improvement can be achieved, compared to a case where the $O_2/C$ is controlled by the throttle valve 2 being used alone, when the $O_2/C$ is controlled by the exhaust recirculation device being used. The reason for this is as follows. In other words, the throttle valve 2 needs to remain almost closed in a case where the total amount of the oxygen that is supplied to the NOx occlusion reduction catalyst 6 is controlled by the throttle valve 2 being used alone on the premise that the target oxygen amount Ot is small. However, in a state where the throttle valve 2 is almost closed, the negative pressure that is generated in that state increases, and thus the flow rate of the air that flows through the throttle valve 2 significantly changes once the throttle valve opening degree slightly deviates from a target value. In a case where the EGR valve 12 and the throttle valve 2 are used along with each other as in the third example, in contrast, the negative pressure can become relatively small, even in a state where the throttle valve 2 is almost closed, by the opening degree of the EGR valve 12 being controlled such that the opening degree of the EGR valve 12 reaches a value exceeding zero. Accordingly, even when the throttle opening degree slightly deviates from the target value, the flow rate of the air that flows through the throttle valve 2 does not change that much. As a result, $O_2/C$ control accuracy can be improved.

The vibration of the internal combustion engine that is generated during the execution of the low flow rate reduction treatment can be mitigated by EGR gas being supplied by the exhaust recirculation device being used during the execution of the low flow rate reduction treatment. In other words, once the piston moves in a state where the throttle valve 2 is closed, a negative pressure is generated between the throttle valve 2 and the combustion chamber 3, and thus the engine rotation speed Ne sharply declines and the vibration is generated from the internal combustion engine. However, the generation of the negative pressure can be mitigated by exhaust being introduced between the throttle valve 2 and the piston by the exhaust recirculation device, and thus the generation of the vibration from the internal combustion engine can be mitigated.

What is claimed is:

1. An exhaust gas control apparatus for an internal combustion engine, the exhaust gas control apparatus comprising:
   a fuel injection device configured to supply a fuel to a combustion chamber of an internal combustion engine;
   a NOx occlusion reduction catalyst disposed on an exhaust passage;
   a fuel addition valve disposed on the exhaust passage and on an upstream side of the NOx occlusion reduction catalyst in a direction in which exhaust flows, the fuel addition valve being configured to add a fuel to the NOx occlusion reduction catalyst;
   an inflow gas adjustment device configured to adjust the amount of fresh gas supplied to the NOx occlusion reduction catalyst; and
   an electronic control unit configured to
      control the fuel injection device, the fuel addition valve, and the inflow gas adjustment device,
      execute a low flow rate reduction treatment when the fuel supply from the fuel injection device is stopped and a flow rate of exhaust gas supplied to the NOx occlusion reduction catalyst is smaller than during an operation of the internal combustion engine, the low flow rate reduction treatment being processing for removing $NO_x$ occluded in the NOx occlusion reduction catalyst by adding the fuel from the fuel addition valve to the NOx occlusion reduction catalyst, and
      control the inflow gas adjustment device such that a ratio of oxygen to the fuel added to the NOx occlusion reduction catalyst at a time when a temperature of the NOx occlusion reduction catalyst is below a predetermined temperature determined in advance becomes higher than a ratio of oxygen to the fuel added to the NOx occlusion reduction catalyst at a time when the temperature of the NOx occlusion reduction catalyst is equal to or higher than the predetermined temperature during the low flow rate reduction treatment.

2. The exhaust gas control apparatus according to claim 1, wherein the electronic control unit is configured to control the fuel addition valve such that the fuel is added by a total fuel addition amount calculated based on a $NO_x$ occlusion amount of the NOx occlusion reduction catalyst and control the inflow gas adjustment device such that oxygen is supplied to the NOx occlusion reduction catalyst by a total oxygen amount calculated based on the amount of the fuel added from the fuel addition valve in a case where the low flow rate reduction treatment is performed in a state where the temperature of the NOx occlusion reduction catalyst is below the predetermined temperature.

3. The exhaust gas control apparatus according to claim 2, wherein:
   the inflow gas adjustment device is an intake air flow rate-adjustable throttle valve.

4. The exhaust gas control apparatus according to claim 3, wherein:

the electronic control unit controls an opening degree of the throttle valve such that a total amount of air supplied to the NOx occlusion reduction catalyst after the fuel supply is stopped becomes larger in the case where the low flow rate reduction treatment is performed in the state where the temperature of the NOx occlusion reduction catalyst is below the predetermined temperature than in a case where the low flow rate reduction treatment is not performed.

5. The exhaust gas control apparatus according to claim 3, wherein:
the electronic control unit is configured to control the opening degree of the throttle valve such that the opening degree of the throttle valve is reduced in stages after the fuel supply from the fuel injection device is stopped when the temperature of the NOx occlusion reduction catalyst is below the predetermined temperature in a case where the low flow rate reduction treatment is performed; and
the electronic control unit is configured to control the opening degree of the throttle valve such that the opening degree of the throttle valve reaches zero at once after the fuel supply from the fuel injection device is stopped when the temperature of the NOx occlusion reduction catalyst is equal to or higher than the predetermined temperature in the case where the low flow rate reduction treatment is performed.

6. The exhaust gas control apparatus according to claim 1, wherein the electronic control unit is configured to perform the low flow rate reduction treatment in a case where a $NO_x$ occlusion amount of the NOx occlusion reduction catalyst is smaller than an upper limit value determined in advance when the fuel supply from the fuel injection device is stopped.

7. The exhaust gas control apparatus according to claim 6, wherein the upper limit value set when the fuel injection is stopped in conjunction with an ignition switch being switched to OFF differs from the upper limit value set when the fuel injection is stopped in conjunction with deceleration.

8. The exhaust gas control apparatus according to claim 1, further comprising:
an external EGR device including an EGR passage allowing the exhaust passage and an intake passage of an internal combustion engine to communicate with each other and an EGR valve disposed on the EGR passage; and
a throttle valve configured to adjust an intake air flow rate, wherein:
the inflow gas adjustment device is the throttle valve and the external EGR device; and
the electronic control unit is configured to control an opening degree of the EGR valve such that the opening degree of the EGR valve exceeds zero while controlling an opening degree of the throttle valve such that the opening degree of the throttle valve is reduced in stages after the fuel supply from the fuel injection device is stopped when the temperature of the NOx occlusion reduction catalyst is below the predetermined temperature during the low flow rate reduction treatment.

9. The exhaust gas control apparatus according to claim 1, wherein the predetermined temperature is a catalyst activation temperature.

10. The exhaust gas control apparatus according to claim 1, wherein the electronic control unit is configured to control the inflow gas adjustment device such that the ratio of the oxygen to the fuel added to the NOx occlusion reduction catalyst becomes a ratio at which the amount of the fuel added from the fuel addition valve and converted to CO in the NOx occlusion reduction catalyst is equal to or greater than a predetermined amount in a case where the low flow rate reduction treatment is performed in a state where the temperature of the NOx occlusion reduction catalyst is below the predetermined temperature.

* * * * *